US011159594B2

(12) United States Patent
Lee et al.

(10) Patent No.: US 11,159,594 B2
(45) Date of Patent: Oct. 26, 2021

(54) STREAMING SERVICE DATA RECEIVING DEVICE AND METHOD IN MOBILE COMMUNICATION SYSTEM FOR SUPPORTING PLURALITY OF RADIO ACCESS INTERFACES

(71) Applicant: Samsung Electronics Co., Ltd., Suwon-si (KR)

(72) Inventors: Chul-Ho Lee, Suwon-si (KR); Namasivayam Ramkumar Ganapathy, Suwon-si (KR); Jin-Hyoung Kim, Seoul (KR); Yong-Seok Park, Seoul (KR); Jin-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 15/514,738

(22) PCT Filed: Sep. 30, 2015

(86) PCT No.: PCT/KR2015/010275
§ 371 (c)(1),
(2) Date: Mar. 27, 2017

(87) PCT Pub. No.: WO2016/052973
PCT Pub. Date: Apr. 7, 2016

(65) Prior Publication Data
US 2017/0264657 A1   Sep. 14, 2017

(30) Foreign Application Priority Data
Sep. 30, 2014   (KR) ........................ 10-2014-0131856

(51) Int. Cl.
*H04L 29/06*   (2006.01)
*H04W 28/08*   (2009.01)
(Continued)

(52) U.S. Cl.
CPC ....... *H04L 65/4084* (2013.01); *H04B 17/318* (2015.01); *H04L 43/0888* (2013.01);
(Continued)

(58) Field of Classification Search
CPC . H04L 65/4084; H04L 65/1069; H04L 65/80; H04L 12/5692; H04L 43/0888;
(Continued)

(56) References Cited

U.S. PATENT DOCUMENTS 8,886,181 B2 * 11/2014 Ganesan ............... H04W 36/18
455/432.1
2002/0141512 A1 * 10/2002 Blanke .................. H04W 88/08
375/316
(Continued)

FOREIGN PATENT DOCUMENTS

CN   103139882 A   6/2013
CN   103945498 A   7/2014
(Continued)

OTHER PUBLICATIONS

Chinese Office Action dated Sep. 3, 2019, issued in Chinese Application No. 201580053236.4.
(Continued)

*Primary Examiner* — Dhairya A Patel
*Assistant Examiner* — Sujana Khakural
(74) *Attorney, Agent, or Firm* — Jefferson IP Law, LLP

(57) ABSTRACT

The present invention relates to technology for a sensor network, machine to machine (M2M) communication, machine type communication (MTC), and the Internet of things (IoT). The present invention can be utilized for intelligent services (smart home, smart building, smart city, smart car or connected car, health care, digital education, retail business, security and safety-related services, and the like) based on the technology. The present invention relates (Continued)

to a streaming service data receiving method of a terminal in a mobile communication system for supporting a plurality of radio access interfaces, the method comprising a step of receiving streaming service data from a server through at least one of the plurality of radio access interfaces, wherein the at least one radio access interface is selected such that the streaming service data can be received at a network speed corresponding to an encoding bit rate to be applied to the streaming service.

18 Claims, 20 Drawing Sheets

(51) Int. Cl.
  *H04L 29/08* (2006.01)
  *H04B 17/318* (2015.01)
  *H04L 12/26* (2006.01)
(52) U.S. Cl.
  CPC .......... *H04L 43/16* (2013.01); *H04L 65/1069* (2013.01); *H04L 65/80* (2013.01); *H04L 67/02* (2013.01); *H04W 28/08* (2013.01)
(58) Field of Classification Search
  CPC ....... H04L 43/16; H04L 67/02; H04B 17/318; H04W 28/08; H04W 28/02; H04W 36/14; H04W 48/18; H04W 88/06; H04W 92/10
  See application file for complete search history.

(56) References Cited

U.S. PATENT DOCUMENTS

| | | | |
|---|---|---|---|
| 2009/0207736 A1 | 8/2009 | Gong et al. | |
| 2010/0262266 A1* | 10/2010 | Chang | H04H 60/12 700/94 |
| 2011/0080940 A1* | 4/2011 | Bocharov | H04N 21/4348 375/240.01 |
| 2012/0110141 A1* | 5/2012 | Biderman | H04N 21/234327 709/219 |
| 2012/0311173 A1* | 12/2012 | Agarwal | H04L 43/0852 709/231 |
| 2012/0311174 A1* | 12/2012 | Bichot | H04L 65/4092 709/231 |
| 2013/0003541 A1 | 1/2013 | Zakrzewski | |
| 2013/0095806 A1* | 4/2013 | Salkintzis | H04L 65/601 455/414.3 |
| 2013/0128778 A1 | 5/2013 | Bennett | |
| 2013/0223240 A1* | 8/2013 | Hayes | H04L 65/1066 370/252 |
| 2013/0254420 A1* | 9/2013 | Chapweske | H04N 21/2402 709/232 |
| 2013/0287091 A1* | 10/2013 | Shaw | H04N 19/115 375/240.02 |
| 2014/0241322 A1 | 8/2014 | Kim et al. | |
| 2014/0286316 A1* | 9/2014 | Park | H04W 76/16 370/332 |
| 2014/0313954 A1 | 10/2014 | Choi et al. | |
| 2014/0337007 A1* | 11/2014 | Waibel | G10L 13/02 704/3 |
| 2015/0011212 A1* | 1/2015 | Andrei | H04W 36/32 455/436 |
| 2015/0055562 A1* | 2/2015 | Shulman | H04W 72/085 370/329 |
| 2015/0373574 A1* | 12/2015 | Gordon | H04L 41/5067 370/252 |

FOREIGN PATENT DOCUMENTS

| | | |
|---|---|---|
| JP | 2008-011452 A | 1/2008 |
| KR | 10-2005-0047920 A | 5/2005 |
| KR | 10-0649876 B1 | 11/2006 |
| KR | 10-1243737 B1 | 3/2013 |
| KR | 10-2013-0037574 A | 4/2013 |
| KR | 10-1297411 B1 | 8/2013 |
| KR | 10-1332615 B1 | 11/2013 |
| WO | 2012-115431 A2 | 8/2012 |
| WO | 2014/092972 A1 | 6/2014 |

OTHER PUBLICATIONS

Chinese Examination Report dated Apr. 29, 2020, issued in Chinese Application No. 201580053236.4.

* cited by examiner

STREAMING SERVICE DATA RECEIVING DEVICE AND METHOD IN MOBILE COMMUNICATION SYSTEM FOR SUPPORTING PLURALITY OF RADIO ACCESS INTERFACES

CROSS-REFERENCE TO RELATED APPLICATION(S)

This application is a U.S. National Stage application under 35 U.S.C. §371 of an International application filed on Sep. 30, 2015 and assigned application number PCT/KR2015/010275, which claimed the benefit of a Korean patent application filed on Sep. 30, 2014 in the Korean Intellectual Property Office and assigned Serial number 10-2014-0131856, the entire disclosure of which is hereby incorporated by reference.

TECHNICAL FIELD

The present disclosure relates to a streaming service data receiving apparatus and method in a mobile communication system, and more particularly, to an apparatus and method for receiving streaming service data in a mobile communication system supporting a plurality of radio access interfaces.

BACKGROUND

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Mobile communication systems have been rapidly progressed, and smart phones have been populated, so use of mobile data has been rapidly increased. In particular, a streaming service such as video traffic accounts for the highest percentage among mobile traffic, it will be predicted that video traffic accounts for 66% of total mobile traffic in 2014 according to a Cisco Visual Networking Index data.

Meanwhile, examples of a video streaming service which has been widely used in a mobile communication system are a service provided at a YouTube site and a service provided at a Netflix site. The YouTube site and the Netflix site provide a streaming service, e.g., a video streaming service which is based on a Hypertext Transfer Protocol (HTTP). Here, a reason why the video streaming service which is based on the HTTP is preferable compared to an existing video streaming protocol will be described below.

The first reason is that the video streaming service which is based on the HTTP is less expensive than the existing video streaming protocol. The video streaming service which is based on the HTTP is the same as a case of downloading data using an HTTP data. So, the video streaming service which is based on the HTTP does not request a specific protocol from a station, and a server needs to provide only a WEB service.

The second reason is that it is easy for the video streaming service which is based on the HTTP to pass a firewall compared to the existing video streaming protocol. A plurality of sites which have been currently provided have been blocked by a firewall except for well-known ports. Existing video streaming protocols use a specific port using a User Datagram Protocol (UDP), so there is a high probability that the existing video streaming protocols will be finally blocked by the firewall. On the contrary, the video streaming service which is based on the HTTP uses a well-known 80 port, so there is an advantage that the video streaming service which is based on the HTTP may easily pass the firewall.

The fourth reason is that a proxy server or a cache server has been widely used for reducing load of a server or fast data transmission, it is relatively easy to use the proxy server or the cache server since there is a need for only a simple WEB server for providing the video streaming service which is based on the HTTP.

Meanwhile, a currently the most used video streaming protocol which is based on an HTTP includes an HTTP Progressive Download (PL) protocol and an HTTP Adaptive Streaming (AS) protocol. Compared to a general HTTP protocol, the HTTP PL protocol and the HTTP AS protocol are similar to the general HTTP protocol except that the HTTP PL protocol and the HTTP AS protocol report a communication state of a station to a server to provide a Quality of Service (QoS).

Meanwhile, a station has been progressed according to progress of a mobile communication system. Recently, one station is capable of supporting a plurality of radio access interfaces. For example, a station may support total two radio access interfaces including a wireless fidelity (Wi-Fi) interface and a long term evolution-advanced (LTE) interface.

However, in a mobile communication system which has been proposed up to now, even though a station supports a plurality of radio access interfaces, a streaming service is provided to the station through one of the plurality of radio access interfaces at corresponding time. So, it is inevitable that a streaming service is provided to the station through a limited radio access interface at a limited network speed, so a break phenomenon may occur when the streaming service is played, and this finally results in service quality degradation.

So, there is a need for a scheme of seamlessly receiving streaming service data in a mobile communication system.

More particularly, in a case of a video streaming service, it is important that a station receives video streaming service data at a network speed which corresponds to an encoding bit rate applied to video content in a server. However, in a mobile communication system proposed up to now, there is no detailed scheme of receiving video streaming service data at a network speed which corresponds to an encoding bit rate applied to video content in a server.

So, there is a need for a scheme of receiving video streaming service data corresponding to an encoding bit rate applied to streaming service content in a mobile communication system.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes an apparatus and method for receiving streaming service data in a mobile communication system supporting a plurality of radio access interfaces.

An embodiment of the present disclosure proposes an apparatus and method for seamlessly receiving streaming service data in a mobile communication system supporting a plurality of radio access interfaces.

An embodiment of the present disclosure proposes an apparatus and method for receiving streaming service data corresponding to an encoding bit rate applied to streaming service content in a mobile communication system supporting a plurality of radio access interfaces.

An embodiment of the present disclosure proposes an apparatus and method for receiving streaming service data by considering load balancing in a mobile communication system supporting a plurality of radio access interfaces.

An embodiment of the present disclosure proposes an apparatus and method for receiving streaming service data such that high-definition video content may be played from playback start time in a mobile communication system supporting a plurality of radio access interfaces according to an embodiment of the present disclosure.

An embodiment of the present disclosure proposes an apparatus and method for receiving streaming service data by considering guarantee of stability in a mobile communication system supporting a plurality of radio access interfaces.

In accordance with an aspect of the present disclosure, a method for receiving streaming service data of a station in a mobile communication system supporting a plurality of radio access interfaces is provided. The method includes receiving streaming service data from a server through at least one of a plurality of radio access interfaces, wherein the at least one of the plurality of radio access interfaces is selected such that the streaming service data may be received at a network speed which corresponds to an encoding bit rate applied to the streaming service.

In accordance with another aspect of the present disclosure, a station in a mobile communication system supporting a plurality of radio access interfaces is provided. The station includes a receiver for receiving streaming service data from a server through at least one of a plurality of radio access interfaces, wherein the at least one of the plurality of radio access interfaces is selected such that the streaming service data may be received at a network speed which corresponds to an encoding bit rate applied to the streaming service.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIG. 17 schematically illustrates a process of measuring a bandwidth shown in step 1617 in FIG. 16a;

Throughout the drawings, it should be noted that like reference numbers are used to depict the same or similar elements, features, and structures.

DETAILED DESCRIPTION

Figure 1:
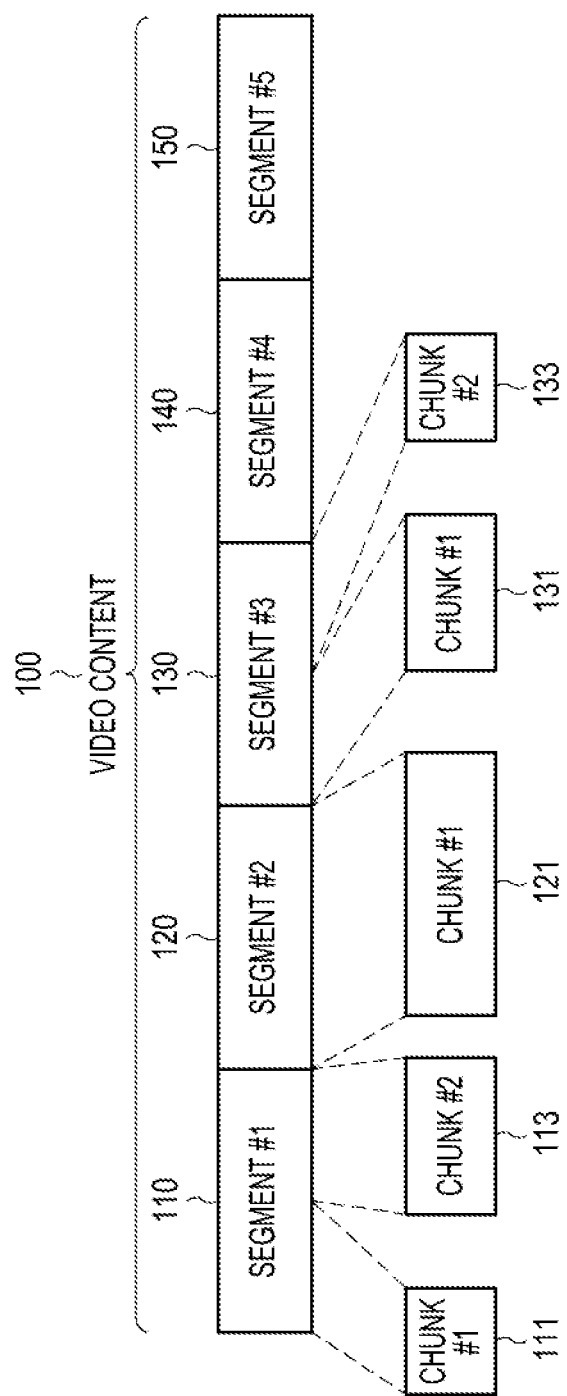
FIG. 1 schematically illustrates an example of a format of streaming service content in a communication system supporting a plurality of radio access interfaces according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a station may be an electronic device.

According to various embodiments of the present disclosure, a station operates as, for example, a receiving apparatus of receiving streaming service data, and a server operates as, for example, a transmitting apparatus of transmitting streaming service data.

An embodiment of the present disclosure proposes an apparatus and method for receiving streaming service data in a mobile communication system supporting a plurality of radio access interfaces.

An embodiment of the present disclosure proposes an apparatus and method for seamlessly receiving streaming service data in a mobile communication system supporting a plurality of radio access interfaces.

An embodiment of the present disclosure proposes an apparatus and method for receiving streaming service data corresponding to an encoding bit rate applied to streaming service content in a mobile communication system supporting a plurality of radio access interfaces.

An embodiment of the present disclosure proposes an apparatus and method for receiving streaming service data by considering load balancing in a mobile communication system supporting a plurality of radio access interfaces.

An embodiment of the present disclosure proposes an apparatus and method for receiving streaming service data such that high-definition video content may be played high-definition video content from playback start time in a mobile communication system supporting a plurality of radio access interfaces.

An embodiment of the present disclosure proposes an apparatus and method for receiving streaming service data by considering guarantee of stability in a mobile communication system supporting a plurality of radio access interfaces.

An apparatus and method proposed in various embodiments of the present disclosure may be applied to various communication systems such as an institute of electrical and electronics engineers (IEEE) 802.11ac communication system, an IEEE 802.16 communication system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, a mobile internet protocol (Mobile IP) system, and/or the like.

Firstly, terminologies used in various embodiments of the present disclosure will be described below.

(1) Segment

A segment denotes a part of streaming service content, e.g., video content, and the streaming service content includes at least one segment.

If a streaming service is downloaded using a Hypertext Transfer Protocol (HTTP) Progressive Download (PL) protocol and an HTTP Adaptive Streaming (AS) protocol which are based on an HTTP, a size of the segment may be determined as the following.

Firstly, in a case that the streaming service is downloaded using an HTTP PL protocol, an entity fragmenting/merging streaming service data autonomously determines a segment size of a fixed/variable size in order for a station to use a plurality of radio access interfaces. For example, if the streaming service is downloaded using the HTTP PL protocol, a segment size may be determined as 10 MB. Alternatively, the segment size may be determined as a bit rate of a streaming service * segment time.

Secondly, if the streaming service is downloaded using an HTTP AS protocol, a basic unit to which encoding is applied based on a plurality of bit rates is the segment. In this case, a segment size is determined in an application layer.

(2) Chunk

If a plurality of radio access interfaces are used at the same time, a chunk denotes a range or amount of streaming service data which is intended to receive through each of the plurality of radio access interfaces. The chunk is a part of the segment, and one segment includes at least one chunk.

If one segment includes a plurality of chunks, and the plurality of radio access interfaces are used at the same time, each of the plurality of chunks will be received through each of the plurality of radio access interfaces, or the plurality of chunks will be received through one of the plurality of radio access interfaces, or the plurality of chunks will be received through a part of the plurality of radio access interfaces.

Exceptionally, if a size of a segment is less than a threshold segment size, a plurality of segments may be configured as one chunk. Here, the threshold segment size may be determined appropriate to a situation of a mobile communication system, and an operation of determining the threshold segment size will be omitted herein.

An example of a format of streaming service content in a communication system supporting a plurality of radio access interfaces according to an embodiment of the present disclosure will be described with reference to FIG. 1.

FIG. 1 schematically illustrates an example of a format of streaming service content in a communication system supporting a plurality of radio access interfaces according to an embodiment of the present disclosure.

Referring to FIG. 1, streaming service content is, for example, video content 100, and the video content 100 includes a plurality of segments, e.g., five segments, i.e., a segment #1 110, a segment #2 120, a segment #3 130, a segment #4 140, and a segment #5 150. The segment #1 110 includes a plurality of chunks, e.g., two chunks, i.e., a chunk #1 111 and a chunk #2 113, the segment #2 120 includes a chunk #1 121, and the segment #3 130 includes a plurality of chunks, e.g., two chunks, i.e., a chunk #1 131 and a chunk #2 133.

An example of a format of streaming service content in a communication system supporting a plurality of radio access interfaces according to an embodiment of the present disclosure has been described with reference to FIG. 1, and another example of a format of streaming service content in a communication system supporting a plurality of radio access interfaces according to an embodiment of the present disclosure will be described with reference to FIG. 2.

Figure 2:
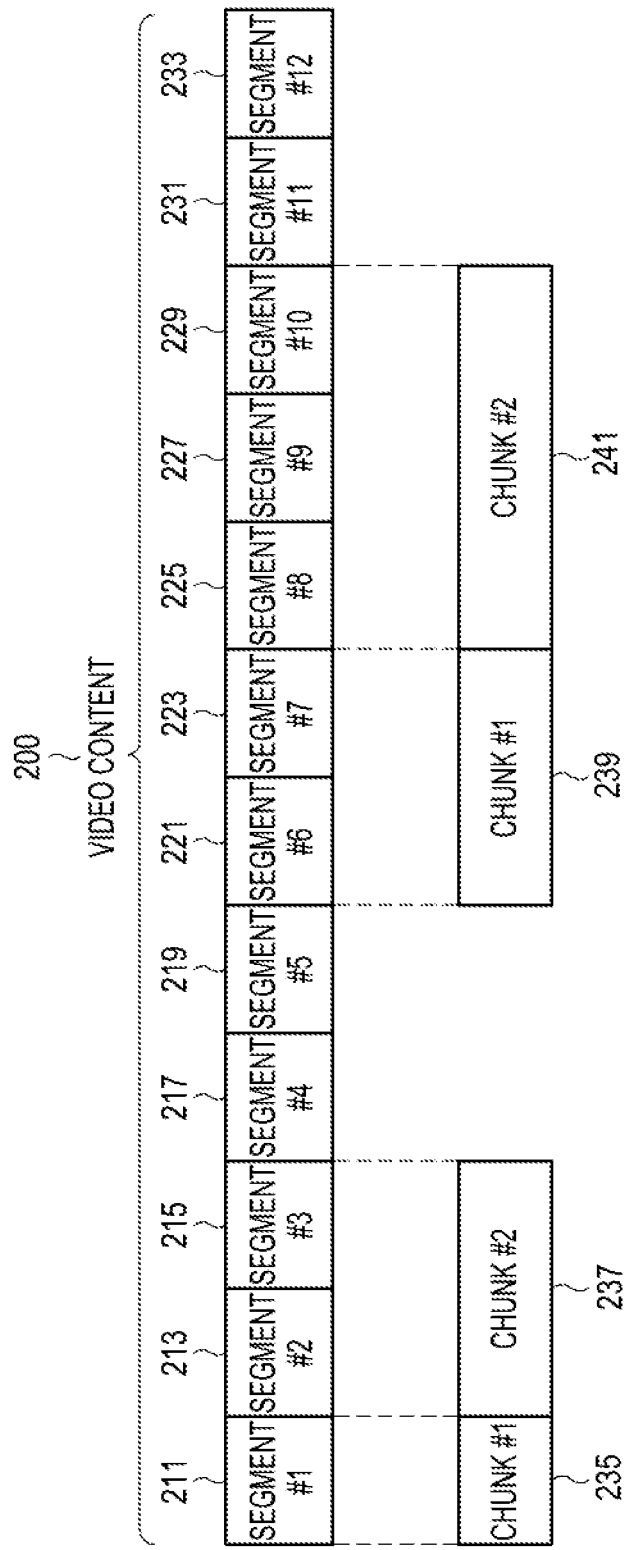
FIG. 2 schematically illustrates another example of a format of streaming service content in a communication system supporting a plurality of radio access interfaces according to an embodiment of the present disclosure.

FIG. 2 schematically illustrates another example of a format of streaming service content in a communication system supporting a plurality of radio access interfaces according to an embodiment of the present disclosure.

Referring to FIG. 2, streaming service content is, for example, video content 200, and the video content 200 includes a plurality of segments, e.g., 12 segments, i.e., a segment #1 211, a segment #2 213, a segment #3 215, a segment #4 217, a segment #5 219, a segment #6 221, a segment #7 223, a segment #8 225, a segment #9 227, a segment #10 229, a segment #11 231, and a segment #12 233.

And, the segment #2 213 and the segment #3 215 configure a chuck #2 237, the segment #6 221 and the segment #7 223 configure a chuck #1 239, and the segment #8 225, the segment #9 227, and the segment #10 229 configure a chuck #2 241. Here, each of the segment #2 213, the segment #3 215, the segment #6 221, the segment #7 223, the segment #8 225, the segment #9 227, and the segment #10 229 has a segment size less than a threshold segment size and may be configured as a chuck as described above.

Another example of a format of streaming service content in a communication system supporting a plurality of radio access interfaces according to an embodiment of the present disclosure has been described with reference to FIG. 2, and a fast pre-fetching process for a streaming service in a communication system supporting a plurality of radio access interfaces according to an embodiment of the present disclosure will be described with reference to FIG. 3.

Figure 3:
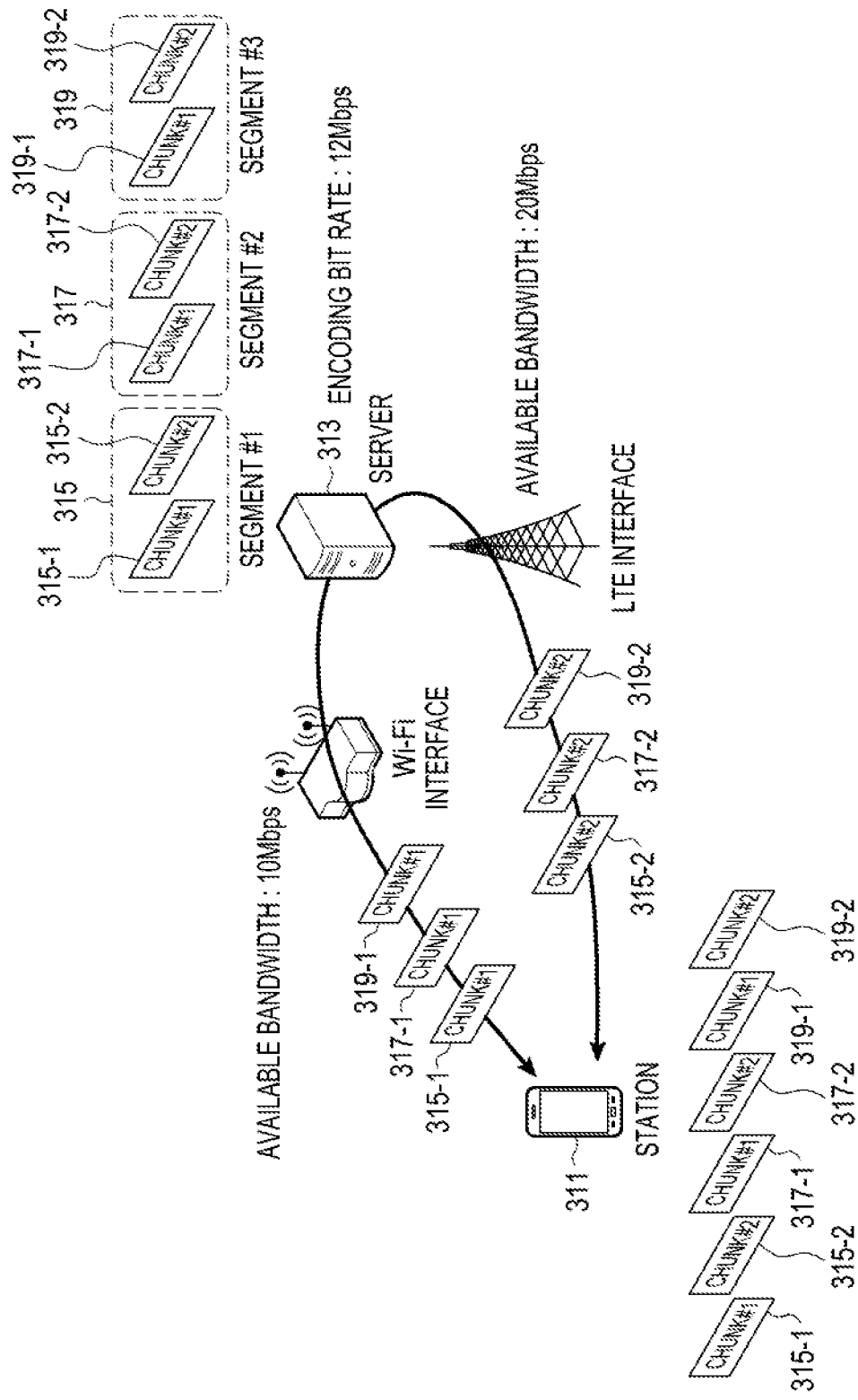
FIG. 3 schematically illustrates a fast pre-fetching process for a streaming service in a communication system supporting a plurality of radio access interfaces according to an embodiment of the present disclosure.

FIG. 3 schematically illustrates a fast pre-fetching process for a streaming service in a communication system supporting a plurality of radio access interfaces according to an embodiment of the present disclosure.

Referring to FIG. 3, the communication system includes a station 311 and a sever 313.

The server 313 provides a streaming service, and may be, for example, a server operating a site such YouTube, Netflix, and the like.

The station 311 may be provided with a streaming service from the server 313 and may include a plurality of radio access interfaces. In FIG. 3, it will be assumed that the station 311 includes two radio access interfaces, e.g., a Wi-Fi interface and an LTE interface. Further, it will be assumed that all of the Wi-Fi interface and the LTE interface are available.

Firstly, upon detecting that a streaming service provision request such as a playback start command, a seek command, and the like, the station 311 may decrease pre-buffering time for playing a streaming service using the plurality of radio access interfaces. Specially, the station 311 predicts a network speed, i.e., an available bandwidth for each of the Wi-Fi interface and the LTE interface upon receiving streaming service data through the Wi-Fi interface and the LTE interface. Hereinafter, for convenience, it will be noted that the network speed and the available bandwidth may be used at the same time or may be interchangeable each other.

A process of estimating a network speed for each of a plurality of radio access interfaces in a station will be described below.

Firstly, the station may estimate a network speed based on amount of streaming service data received during each unit time, and this may be expressed as Equation 1.

$$\text{network speed} = \text{network speed} \times \beta + \frac{\text{the number of received bits}}{\Delta} \times (1 - \beta) \quad \text{[Equation 1]}$$

In Equation 1, $\beta$ is a preset value, and may be varied corresponding to a situation of a mobile communication system.

Secondly, the station may estimate a network speed based on amount of streaming service data received every preset time from time at which the station starts receiving a chunk through each radio access interface, and this may be expressed as Equation 2.

$$\text{network speed} = \frac{\text{the number of received bits}}{t - t_0} \quad \text{[Equation 2]}$$

In Equation 2, $t_0$ denotes time at which chunk reception is started through a corresponding radio access interface, t denotes time at which a network speed is estimated for a corresponding radio access interface, and $t-t0$ denotes set time.

Meanwhile, as shown in FIG. 3, it will be assumed that the server 311 transmits a segment #1 315, a segment #2 317, and a segment #3 319, and each of the segment #1 315, the segment #2 317, and the segment #3 319 includes two chunks. That is, the segment #1 315 includes a chunk #1 315-1 and a chunk #2 315-2, the segment #2 317 includes a chunk #1 317-1 and a chunk #2 317-2, and the segment #3 319 includes a chunk #1 319-1 and a chunk #2 319-2.

A chunk #1, i.e., the chunk #1 315-1, the chunk #1 317-1, and the chunk #1 319-1 which the segment #1 315, the segment #2 317, and the segment #3 319 include, respectively, are provided to the station 311 through the Wi-Fi interface, and a chunk #2, i.e., the chunk #2 315-2, the chunk #2 317-2, and the chunk #2 319-2 which the segment #1 315, the segment #2 317, and the segment #3 319 include, respectively, are provided to the station 311 through the LTE interface.

That is, the station 311 transmits, to the server 313 through the Wi-Fi interface, a message, e.g., an HTTP range message to request to provide the chunk #1, i.e., the chunk #1 315-1, the chunk #1 317-1, and the chunk #1 319-1 which the segment #1 315, the segment #2 317, and the segment #3 319 include, respectively, and transmits, to the server 313 through the LTE interface, a message, e.g., an HTTP range message to request to provide the chunk #2, i.e., the chunk #2 315-2, the chunk #2 317-2, and the chunk #2 319-2 which the segment #1 315, the segment #2 317, and the segment #3 319 include, respectively. Here, the HTTP range message may is included in an HTTP GET message, and the HTTP message may include Itag indicating a specific streaming file and a range indicating data of a specific range, and the Itag and range are a request Uniform Resource Identifier (URI). That is, an existing request for streaming service data performed using one HTTP GET message is performed with a request for streaming service data for each of a plurality of radio access interfaces using a plurality of HTTP range messages.

After receiving the HTTP range message from each of the Wi-Fi interface and the LTE interface of the station 311, the server 313 transmits an HTTP 200 OK message to each of the Wi-Fi interface and the LTE interface and provides data requested from each of the Wi-Fi interface and the LTE interface along with the HTTP 200 OK message to each of the Wi-Fi interface and the LTE interface.

Here, an operation between the station 311 and the server 313 will be described below.

Firstly, a case that the station 311 does not recognize an available bandwidth/network speed of each of the Wi-Fi interface and the LTE interface will be described below.

The station 311 does not recognize the available bandwidth/network speed of each of the Wi-Fi interface and the LTE interface, so the station 311 requests a chunk of the same size from the server 313 at each of the Wi-Fi interface and the LTE interface, and receives the chunk of the same size from the server 313 through each of the Wi-Fi interface and the LTE interface.

Alternatively, even though the station 311 does not recognize the available bandwidth/network speed of each of the Wi-Fi interface and the LTE interface, if there is a preset chunk size for each of the Wi- Fi interface and the LTE interface, the station 311 requests a chunk of a corresponding size from the server 313 through each of the Wi-Fi interface and the LTE interface, and receives the chunk of the corresponding size from the server 313 through each of the Wi-Fi interface and the LTE interface. Here, a chunk size of each of the Wi-Fi interface and the LTE interface may be set with various forms, and the chunk size of the Wi-Fi interface may be different from the chunk size of the LTE interface.

Secondly, a case that the station 311 recognizes an available bandwidth/network speed of each of the Wi-Fi interface and the LTE interface will be described below.

In a case that the station 311 recognizes the available bandwidth/network speed of each of the Wi-Fi interface and the LTE interface, the station 311 determines a chunk size of each of the Wi-Fi interface and the LTE interface based on the available bandwidth/network speed of each of the Wi-Fi interface and the LTE interface. Here, the station 313 may determine the chunk size, for example, proportional to a size of the available bandwidth, and this will be expressed as Equation 3 and Equation 4.

$$LTE \text{ chunk size} = \text{segment size} \times \frac{LTE \text{ speed}}{\text{Wi-Fi speed} + LTE \text{ speed}} \quad \text{[Equation 3]}$$

In Equation 3, an LTE chunk size denotes a size of a chunk to be received through an LTE interface, and an LTE speed denotes a network speed in a case that a streaming data service is received through the LTE interface.

$$\text{Wi-Fi chunk size} = \text{segment size} \times \frac{\text{Wi-Fi speed}}{\text{Wi-Fi speed} + LTE \text{ speed}} \quad \text{[Equation 4]}$$

In Equation 4, a Wi-Fi chunk size denotes a size of a chunk to be received through a Wi-Fi interface, and a Wi-Fi speed denotes a network speed in a case that a streaming data service is received through the Wi-Fi interface.

Various schemes of determining a chunk size of a corresponding radio access interface based on the available bandwidth/network speed in the station 313 may exist, and a detailed description thereof will be omitted herein.

For example, the station 313 determines a chunk size of a corresponding radio access interface based on the available bandwidth/network speed in FIG. 3, however, the station 313 may determine a chunk size of a corresponding radio access interface based on various parameters as well as the available bandwidth/network speed.

Further, the station 311 requests a chunk of a corresponding size from the server 313 through each of the Wi-Fi interface and the LTE interface, and receives the chunk of the corresponding size from the server 313 through each of the Wi-Fi interface and the LTE interface.

The station 311 recognizes the available bandwidth/network speed of each of the Wi-Fi interface and the LTE interface, the station 311 receives a chunk from a chunk of which a chunk index is minimum among chunks included in a segment through a radio access interface of which a network speed is faster. Here, the station 311 may determine a size of chunk to be received through a corresponding radio access interface with a scheme as described above in Equation 3 and Equation 4, and receives chunks of which chunk indexes are small through a radio access interface of which a network speed is faster.

For example, if a network speed of a Wi-Fi interface is faster, the station 311 requests a chunk of a determined size from a minimum chunk index from the server 313 through the Wi-Fi interface, requests a chunk of a determined size which is not requested through the Wi-Fi interface from the server 313, and receives a chunk of a corresponding size from the server 313 through each of the Wi-Fi interface and the LTE interface.

Thirdly, a case that the station 311 recognizes an available bandwidth/network speed, and stability of each of the Wi-Fi interface and the LTE interface will be described below.

The station 311 receives a chunk from a chunk with a minimum chunk index among chunks included in a segment through a radio access interface with higher stability. The station 311 may determine a size of chunk which will be received through a corresponding radio access interface using a scheme as described in Equation 3 and Equation 4, and chunks with small chunk indexes are received through a radio access interface with higher stability. Various schemes of detecting stability in the station 311 may exist, and a detailed description thereof will be omitted herein.

For example, if stability of an LTE interface is higher, the station 311 requests a chunk of a determined size from a minimum chunk index to the server 313 through the LTE interface, requests a chunk of a determined size which is not requested through the LTE interface to the server 313, and receives a chunk of a corresponding size from the server 313 through each of the Wi-Fi interface and the LTE interface.

Meanwhile, it will be assumed that three operations as described above are maintained during preset time, e.g., 10 seconds or until a preset number of segments are received.

A fast pre-fetching process for a streaming service in a communication system supporting a plurality of radio access interfaces according to an embodiment of the present disclosure has been described with reference to FIG. 3, and an example of a load balancing process for a streaming service in a communication system supporting a plurality of radio access interfaces according to an embodiment of the present disclosure will be described with reference to FIG. 4.

Figure 4:
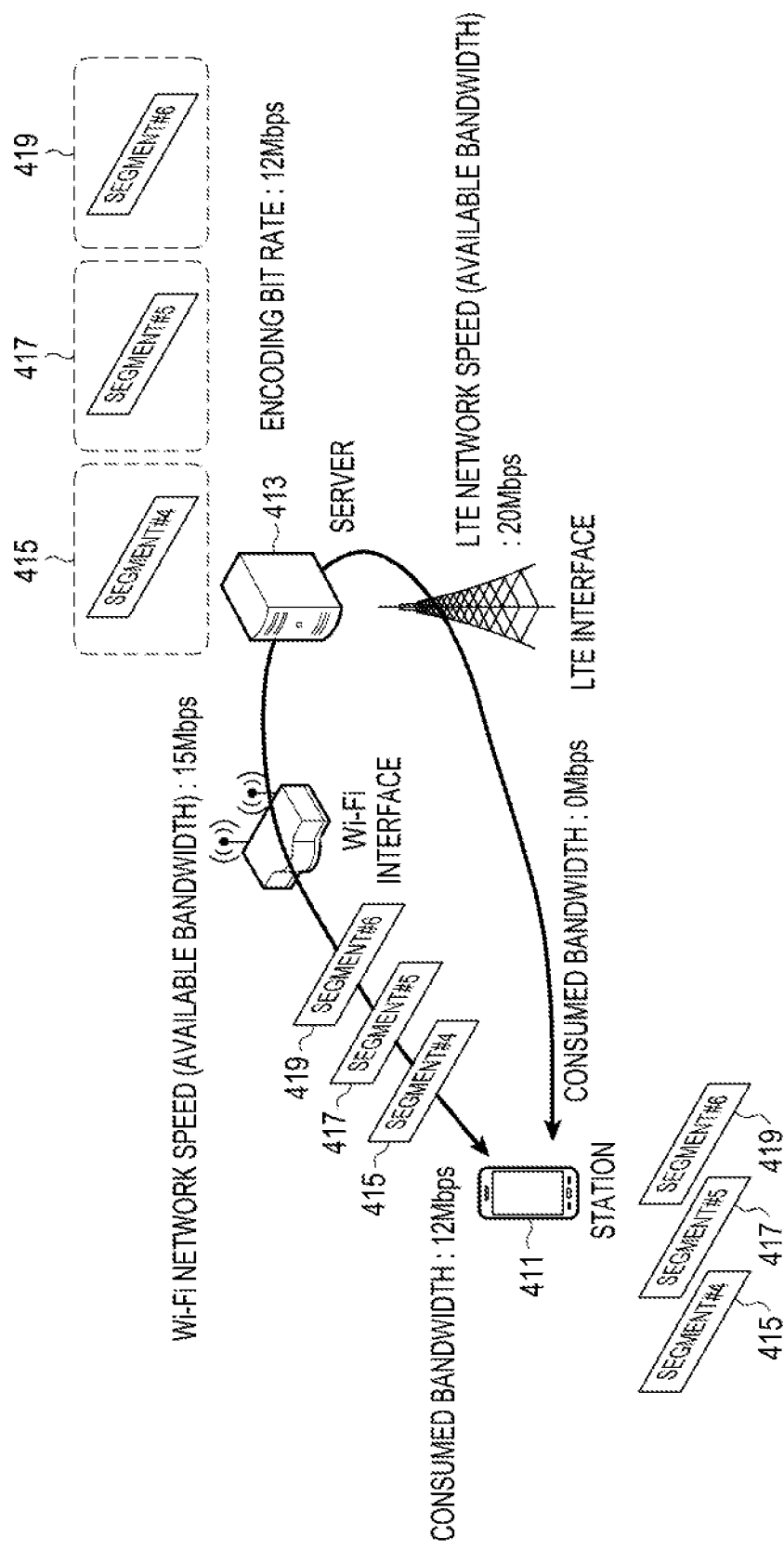
FIG. 4 schematically illustrates an example of a load balancing process for a streaming service in a communication system supporting a plurality of radio access interfaces according to an embodiment of the present disclosure.

FIG. 4 schematically illustrates an example of a load balancing process for a streaming service in a communication system supporting a plurality of radio access interfaces according to an embodiment of the present disclosure.

Referring to FIG. 4, the communication system includes a station 411 and a sever 413. The server 413 provides a streaming service, and may be, for example, a server operating a site such YouTube, Netflix, and the like. The station 411 may be provided with a streaming service from the server 413 and may include a plurality of radio access interfaces. In FIG. 4, it will be assumed that the station 411 includes two radio access interfaces, e.g., a Wi-Fi interface and an LTE interface. Further, it will be assumed that all of the Wi-Fi interface and the LTE interface are available.

The station 411 sets one of the Wi-Fi interface and the LTE interface as a primary radio access interface, and sets the other of the Wi-Fi interface and the LTE interface as a secondary radio access interface. Here, the station 411 may determine the primary radio access interface based on various parameters, e.g., parameters such as billing/charging, power consumption, signal stability, and the like. In FIG. 4, it will be assumed that the Wi-Fi interface is determined as the primary radio access interface.

The station 411 receives streaming service data through the primary radio access interface as possible for maintaining a network speed for the streaming service data corresponding to an encoding bit rate applied to a streaming service in the server 413, and receives the streaming service data through the secondary radio access interface only if the station 411 is not capable of receiving the streaming service data through the primary radio access interface.

As shown in FIG. 4, it will be assumed that the server 413 transmits a segment #4 415, a segment #5 417, and a segment #6 419. The segment #4 415, the segment #5 417, and the segment #6 419 are provided to the station 411 through the Wi-Fi interface. That is, the station 411 transmits, to the server 413, a message, e.g., an HTTP range message to request to provide the segment #4 415, the segment #5 417, and the segment #6 419.

When the HTTP range message is received through the Wi-Fi interface of the station 411, the server 413 transmits an HTTP 200 OK message to the Wi-Fi interface of the station 411, and provides data requested from the Wi-Fi interface along with the HTTP 200 OK message.

That is, as shown in FIG. 4, a bandwidth consumed in the station 411 is 12 Mpbs, the available bandwidth of the Wi-Fi interface is 15 Mpbs, and an encoding bit rate applied to a streaming service in the server 413 is 12 Mbps, so the station 411 requests a chunk to the server 413 through a Wi-Fi interface as a primary radio access interface, and receives the chunk from the server 413. That is, a load balancing process in a case that an available bandwidth of a primary radio access interface may support a network speed which corresponds to an encoding bit rate applied to streaming service data which a station intends to receive is shown in FIG. 4.

That is, the station 411 may perform a load balancing operation based on a criterion as expressed in Equation 5. That is, the criterion as expressed in Equation 5 is satisfied, the station 411 requests a chunk to the server 413 through only a Wi-Fi interface, and receives the chunk from the server 413.

$$\frac{\text{Wi-Fi speed}[bps]}{\text{encoding bit rate applied to streaming service }[bps]} \geq 1 \quad \text{[Equation 5]}$$

Equation 5 means that a Wi-Fi speed is greater than or equal to an encoding bit rate applied to a streaming service, so Equation 5 indicates that a Wi-Fi interface may support a network speed which corresponds to the encoding bit rate applied to the streaming service.

An example of a load balancing process for a streaming service in a communication system supporting a plurality of radio access interfaces according to an embodiment of the present disclosure has been described with reference to FIG. 4, and another example of a load balancing process for a streaming service in a communication system supporting a plurality of radio access interfaces according to an embodiment of the present disclosure will be described with reference to FIG. 5.

Figure 5:
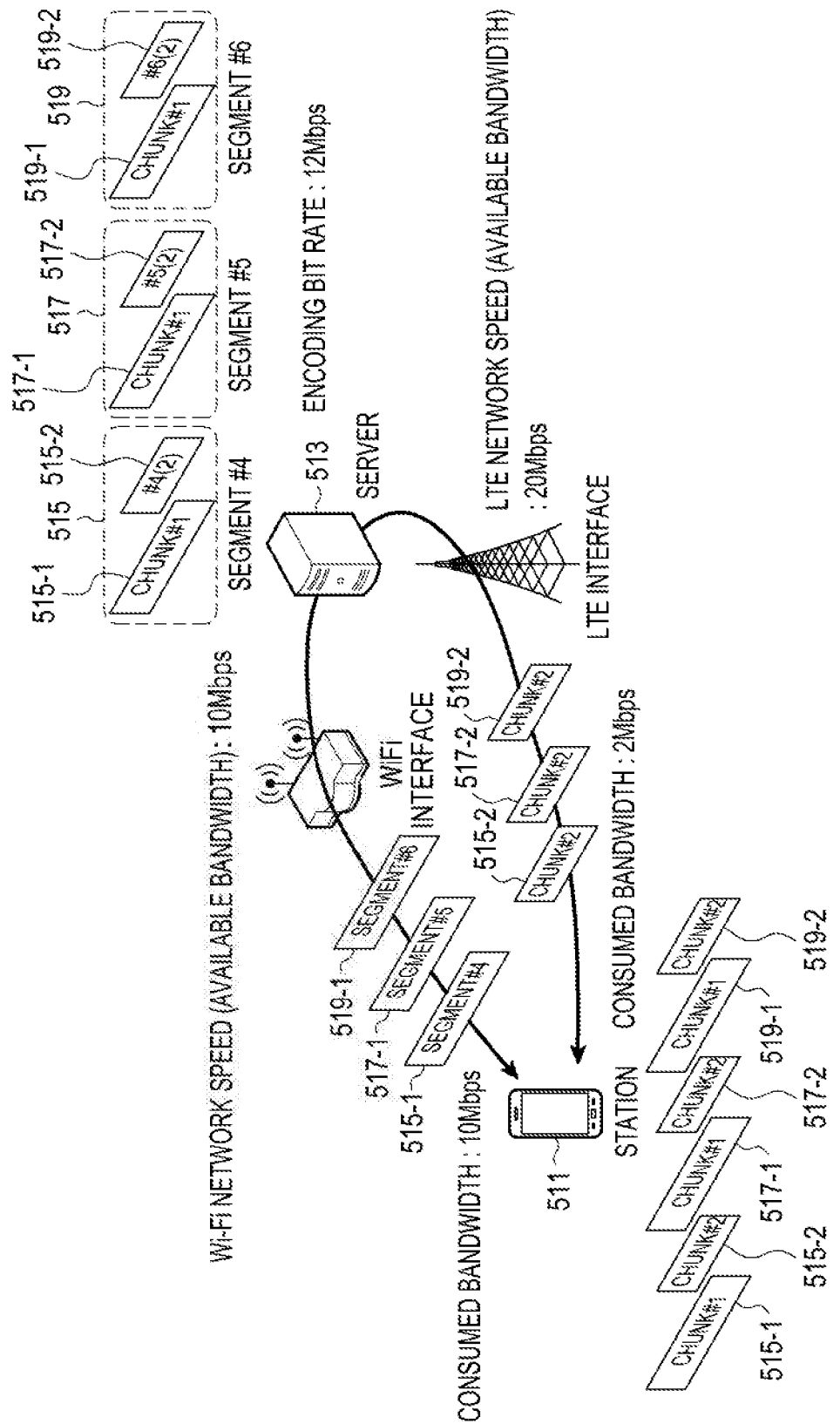
FIG. 5 schematically illustrates another example of a load balancing process for a streaming service in a communication system supporting a plurality of radio access interfaces according to an embodiment of the present disclosure.

FIG. 5 schematically illustrates another example of a load balancing process for a streaming service in a communication system supporting a plurality of radio access interfaces according to an embodiment of the present disclosure.

Referring to FIG. 5, the communication system includes a station 511 and a sever 513. The server 513 provides a streaming service, and may be, for example, a server operating a site such YouTube, Netflix, and the like. The station 511 may be provided with a streaming service from the server 513 and may include a plurality of radio access interfaces. In FIG. 5, it will be assumed that the station 511 includes two radio access interfaces, e.g., a Wi-Fi interface and an LTE interface. Further, it will be assumed that all of the Wi-Fi interface and the LTE interface are available.

The station 511 sets one of the Wi-Fi interface and the LTE interface as a primary radio access interface, and sets the other of the Wi-Fi interface and the LTE interface as a secondary radio access interface. Here, the station 511 may determine the primary radio access interface based on various parameters, e.g., parameters such as billing/charging, power consumption, signal stability, and the like. In FIG. 5, it will be assumed that the Wi-Fi interface is determined as the primary radio access interface.

The station 511 receives streaming service data through the primary radio access interface as possible for maintaining a network speed for the streaming service data corresponding to an encoding bit rate applied to a streaming service in the server 513, and receives the streaming service data through the secondary radio access interface only if the station 511 is not capable of receiving the streaming service data through the primary radio access interface.

As shown in FIG. 5, it will be assumed that the server 513 transmits a segment #4 515, a segment #5 517, and a segment #6 519. Each of the segment #4 515, the segment #5 517, and the segment #6 519 includes a chunk #1 and a chunk #2. That is, the segment #4 515 includes a chunk #1 515-1 and a chunk #2 515-2, the segment #5 517 includes a chunk #1 517-1 and a chunk #2 517-2, and the segment #6 519 includes a chunk #1 519-1 and a chunk #2 519-2. The chunk #1 515-1, chunk #1 517-1, and chunk #1 519-1 are provided to the station 511 through the Wi-Fi interface, and the chunk #2 515-2, chunk #2 517-2, and chunk #2 519-2 are provided to the station 511 through the LTE interface.

That is, the station 511 transmits, to the server 513, a message, e.g., an HTTP range message to request to provide the chunk #1 515-1, chunk #1 517-1, and chunk #1 519-1 through the Wi-Fi interface, and transmits, to the server 513, a message, e.g., an HTTP range message to request to provide the chunk #2 515-2, chunk #2 517-2, and chunk #2 519-2 through the LTE interface.

When the HTTP range message is received from each of the Wi-Fi interface and the LTE interface of the station 511, the server 513 transmits an HTTP 200 OK message to each of the Wi-Fi interface and the LTE interface, and provides data requested from each of the Wi-Fi interface and the LTE interface along with the HTTP 200 OK message to each of the Wi-Fi interface and the LTE interface.

That is, as shown in FIG. 5, a bandwidth consumed in the station 511 is 10 Mbps, the available bandwidth of the Wi-Fi interface is 10 Mbps, and an encoding bit rate applied to a streaming service in the server 513 is 12 Mbps, so the station 511 may not maintain a network speed corresponding to the encoding bit rate applied to the streaming service in the server 513 if the station 511 requests a chunk to the server 513 through only the Wi-Fi interface as a primary radio access interface.

So, the station 511 requests a chunk to the server 513 through the LTE interface as well as the Wi-Fi interface, and receives the chunk from the server 513. That is, a load balancing process in a case that an available bandwidth of a primary radio access interface may not support a network speed which corresponds to an encoding bit rate applied to streaming service data which a station intends to receive is shown in FIG. 5.

That is, the station 511 may perform a load balancing operation based on the criterion as expressed in Equation 5. That is, if the criterion as expressed in Equation 5 is not satisfied, the station 511 requests a chunk to the server 513 through an LTE interface as well as a Wi-Fi interface, and receives the chunk from the server 513. That is, a case that the criterion as expressed in Equation 5 is not satisfied means that a Wi-Fi speed is less than an encoding bit rate applied to a streaming service, so the case indicates that the Wi-Fi interface is not capable of supporting a network speed which corresponds to the encoding bit rate applied to the streaming service.

In this case, the station 511 may determine a chunk size of a chunk which the station 511 will receive through the Wi-Fi interface and a chunk size of a chunk which the station 511 will receive through the LTE interface based on Equation 6 and Equation 7.

$$\text{Wi-Fi chunk size} = \text{segment size} \times \frac{\text{Wi-Fi speed}[bps]}{\text{encoding bit rate applied to streaming service}[bps]} \quad \text{[Equation 6]}$$

$$LTE \text{ chunk size} = \text{segment size} \times \left(1 - \frac{\text{Wi-Fi speed}[bps]}{1 \text{ encoding bit rate applied to streaming service}[bps]}\right) \quad \text{[Equation 7]}$$

Meanwhile, a situation of a mobile communication is always changeable, so the station 511 may set a target network speed which the station 511 targets to a value which is larger than the encoding bit rate applied to the streaming service by a preset value, e.g., a. In this case, Equation 6 and Equation 7 may be changed to Equation 8 and Equation 9. The a may be greater than or equal to 0 ($\alpha \geq 0$).

$$\text{Wi-Fi chunk size} = \text{segment size} \times \frac{\text{Wi-Fi speed}[bps]}{\text{encoding bit rate applied to streaming service} + \alpha\,[bps]} \quad \text{[Equation 8]}$$

$$LTE \text{ chunk size} = \text{segment size} \times \left(1 - \frac{\text{Wi-Fi speed}[bps]}{\text{encoding bit rate applied to streaming service} + \alpha\,[bps]}\right) \quad \text{[Equation 9]}$$

An operation of determining a chunk size of a chunk to be received through a Wi-Fi interface and a chunk size of a chunk to be received through an LTE interface based on Equations 6 to 9 in a case that the criterion as expressed in Equation 5 is not satisfied has been described above.

Alternatively, the station 511 may perform a load balancing operation based on download time consumed for receiving a corresponding segment, this will be described below.

Firstly, upon downloading each segment at a network speed which correspond to an encoding bit rate applied to a streaming service, the station 511 calculates download time consumed for completing download for each segment.

The station 511 detects amount of data which is possible to be received through a primary radio access interface during the download time based on an available bandwidth/network speed of the primary radio access interface. The station 511 receives a segment through the primary radio access interface if the detected amount of the data which is possible to be received through the primary radio access interface during the download time is greater than or equal to a segment size.

If the detected amount of the data which is possible to be received through the primary radio access interface during the download time is less than the segment size, the station 511 requests and receives, through the primary radio access interface, a part, e.g., a chunk #1 of a segment which corresponds to the determined amount of the data which is possible to be received through the primary radio access interface during the download time, and requests and receives a remaining part, e.g., a chunk #2 of the segment through a secondary radio access interface. That is, if the station 511 downloads at the network speed which corresponds to the encoding bit rate applied to the streaming service, the station 511 may determine whether to receive streaming service data using the primary radio access interface or using both the primary radio access interface and the secondary radio access interface based on the download time.

A case that the station 511 determines whether to receive the streaming service data using only the primary radio access interface or using both the primary radio access interface and the secondary radio access interface based on the encoding bit rate applied to the streaming service and the download time has been described above, however, a situation of a mobile communication system is always changeable, so the station 511 may set the target network speed which the station 511 targets to a value which is greater than the encoding bit rate applied to the streaming service by the preset value a.

Another example of a load balancing process for a streaming service in a communication system supporting a plurality of radio access interfaces according to an embodiment of the present disclosure has been described with reference to FIG. 5, and an example of detailed implementation of a load balancing process for a streaming service in a communication system supporting a plurality of radio access interfaces according to an embodiment of the present disclosure will be described with reference to FIG. 6.

Figure 6:
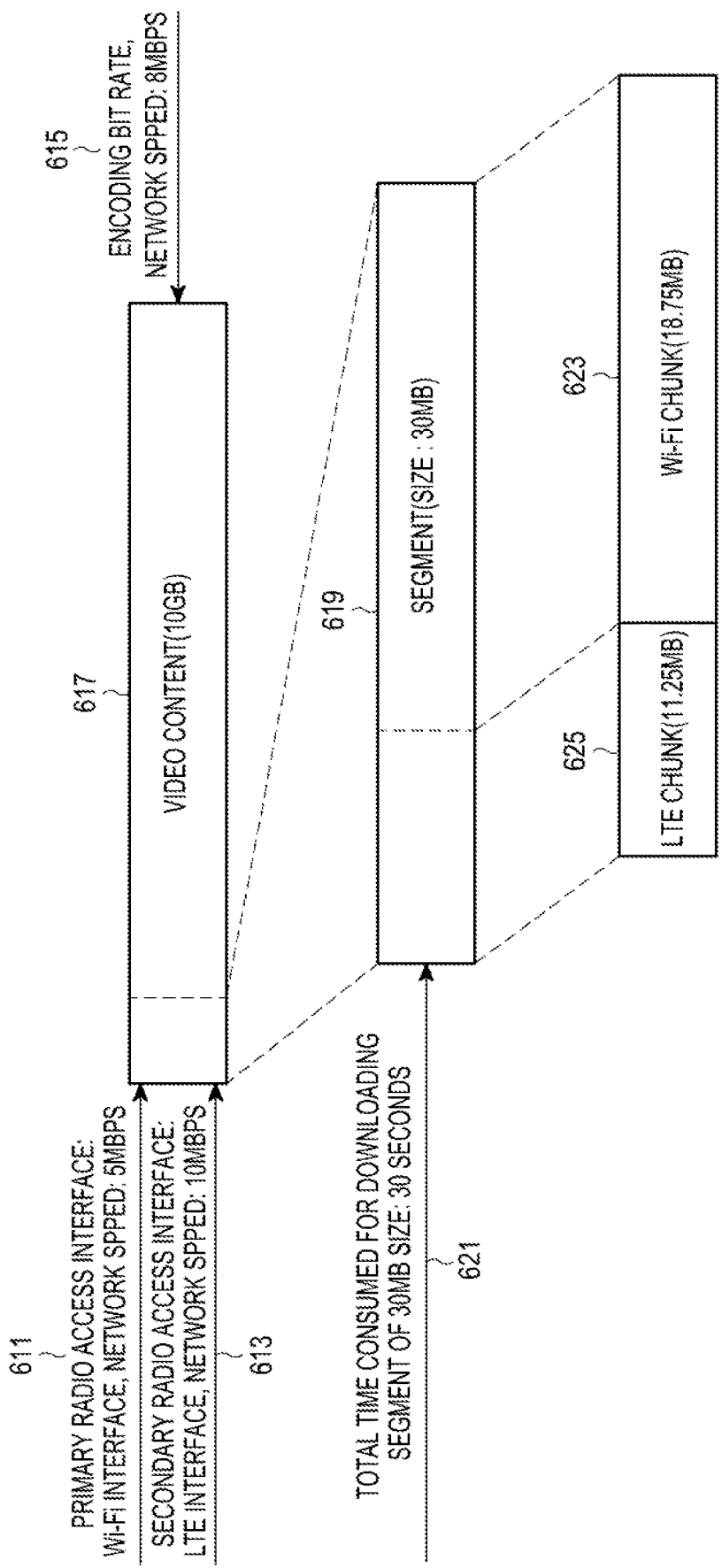
FIG. 6 schematically illustrates an example of detailed implementation of a load balancing process for a streaming service in a communication system supporting a plurality of radio access interfaces according to an embodiment of the present disclosure.

FIG. 6 schematically illustrates an example of detailed implementation of a load balancing process for a streaming service in a communication system supporting a plurality of radio access interfaces according to an embodiment of the present disclosure.

Referring to FIG. 6, it will be assumed that a station (not shown in FIG. 6) sets a primary radio access interface to a Wi-Fi interface (611) and sets a secondary radio access interface to an LTE interface (613). Here, it will be assumed that a network speed of the Wi-Fi interface is 5 Mbps, and a network speed of the LTE interface is 10 Mbps.

Further, it will be assumed that a server (not shown in FIG. 6) applies an encoding bit rate of 8 Mbps to a streaming service, e.g., a video service (615).

It will be assumed that a size of video contents which the station wants to receive is 10 gigabits (GBs) (617). It will be assumed that the video contents include a plurality of segments, and a size of each of the plurality of segments is 30 megabits (MBs) (619). So, in a case that it will be assumed that 8 Mbps as the encoding bit rate applied to the video contents is a network speed, download time consumed for downloading one segment with a size of 30 MB is 30 seconds (621).

Meanwhile, a network speed of the Wi-Fi interface as the primary radio access interface is 5 Mbps, so the Wi-Fi interface is not capable of supporting 8 Mbps as the encoding bit rate applied to the video contents. However, the Wi-Fi interface is the primary radio access interface, so the station determines a chunk size such that the station may use the Wi-Fi interface as maximum as possible. That is, the station determines amount of data which the station may receive during 30 seconds as the download time at 5 Mbps as a network speed of the Wi-Fi interface as 18.75 MBs, so the station determines a size of a chunk, i.e., a Wi-Fi chunk which may be received through the Wi-Fi interface among chunks included in each segment as 18.75 MBs (623).

Further, a chunk of a size of 18.75 MBs among each segment may be received through the Wi-Fi interface, so the station receives a remaining chunk except for a Wi-Fi chunk among chunks included in each chunk through an LTE interface. A chunk received through the LTE interface will be referred to as LTE chunk, so a size of the LTE chunk is 11.25 MBs (=30 MBs-18.75 MBs), and the LTE chunk is received during 9 seconds (625).

Meanwhile, FIG. 6 focuses on a description of an operation of receiving a Wi-Fi chunk and an LTE chunk in a station, however, it will be noted that the station as described above performed an operation of requesting a corresponding chunk from a server already in order for receiving the Wi-Fi chunk and the LTE chunk as described in FIG. 6.

An example of detailed implementation of a load balancing process for a streaming service in a communication system supporting a plurality of radio access interfaces according to an embodiment of the present disclosure has been described with reference to FIG. 6, and relation between a network speed and download time according to detailed implementation of a load balancing process for a streaming service in a communication system supporting a plurality of radio access interfaces as shown in FIG. 6 will be described with reference to FIG. 7.

Figure 7:
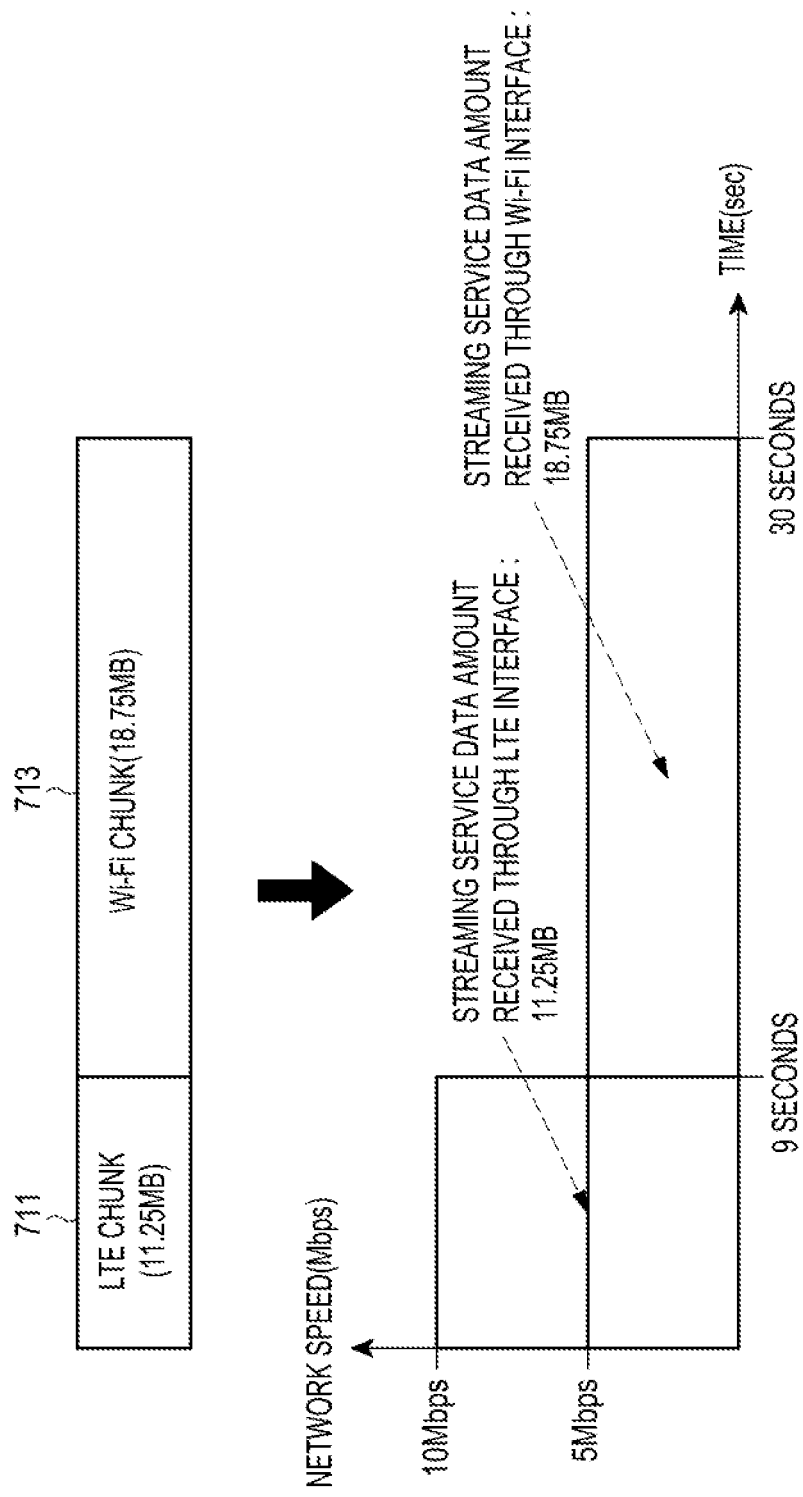
FIG. 7 schematically illustrates relation between a network speed and download time according to detailed implementation of a load balancing process for a streaming service in a communication system supporting a plurality of radio access interfaces as shown in FIG. 6.

FIG. 7 schematically illustrates relation between a network speed and download time according to detailed implementation of a load balancing process for a streaming service in a communication system supporting a plurality of radio access interfaces as shown in FIG. 6.

Referring to FIG. 7, relation between a network speed and download time as shown in FIG. 7 indicates relation between a network speed and download time in a case that an LTE chunk and a Wi-Fi chunk are determined as described in FIG. 6. That is, relation between a network speed and download time as shown in FIG. 7 indicates relation between a network speed and download time in a case that a station receives an LTE chunk 711 of a size of 11.25 MBs during 9 seconds through an LTE interface, and receives a Wi-Fi chunk 713 of a size of 18.75 MBs during 30 seconds through a Wi-Fi interface as described in FIG. 6.

Relation between a network speed and download time according to detailed implementation of a load balancing process for a streaming service in a communication system supporting a plurality of radio access interfaces as shown in FIG. 6 has been described with reference to FIG. 7, and an example of a stability guaranteeing process for a streaming service in a communication system supporting a plurality of radio access interfaces according to an embodiment of the present disclosure will be described with reference to FIG. 8.

Figure 8:
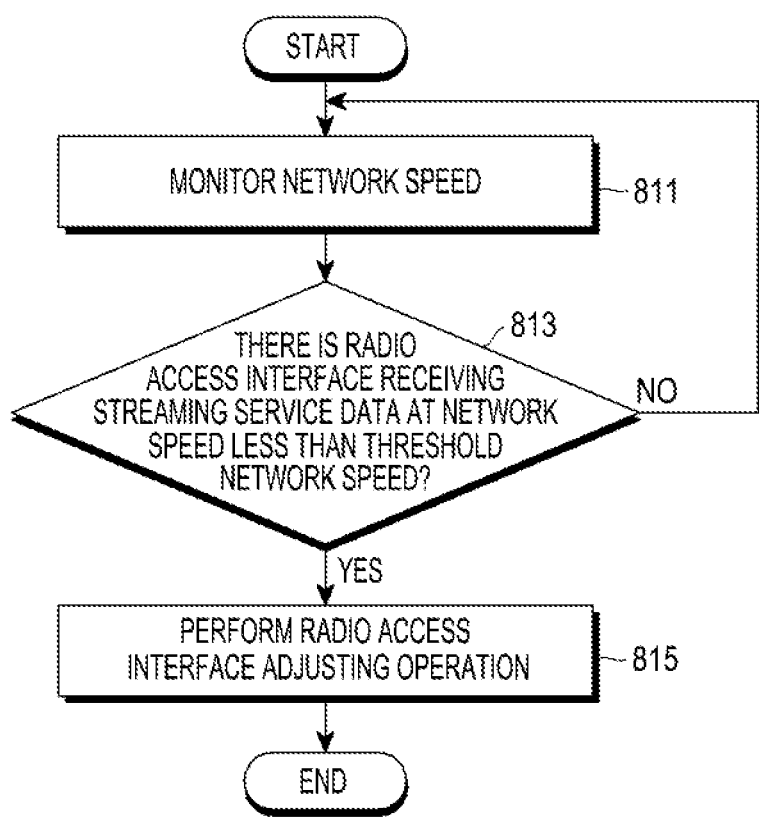
FIG. 8 schematically illustrates an example of a stability guaranteeing process for a streaming service in a communication system supporting a plurality of radio access interfaces according to an embodiment of the present disclosure.

FIG. 8 schematically illustrates an example of a stability guaranteeing process for a streaming service in a communication system supporting a plurality of radio access interfaces according to an embodiment of the present disclosure.

Referring to FIG. 8, as described above, in a case of a streaming service, it may be operated as an important factor affecting a service quality to maintain a network speed corresponding to an encoding bit rate applied to a streaming service in a server. So, a station needs to continuously monitor whether streaming service data is normally received through each radio access interface.

Firstly, the station monitors a network speed of each of radio access interfaces at step 811 and proceeds to step 813. That is, the station monitors the network speed of each of the radio access interfaces for checking whether corresponding chunks are received at a network speed determined at time that a chunk is requested when receiving a segment at step 813. Here, it will be assumed that the monitor interval is maintained during preset time, e.g., 10 seconds or until a preset number of segments are received.

At step 813, the station determines whether there is a radio access interface receiving streaming service data at a network speed less than a threshold network speed. Here, the threshold network speed may be set to the encoding bit rate applied to the streaming service, or a value which is less than the encoding bit rate by a preset value, e.g., (β. Here, β may be greater than or equal to 0 (β≥0).

If there is the radio access interface receiving the streaming service data at the network speed less than the threshold network speed, the station proceeds to step 815. At step 815, upon receiving streaming service data through the radio access interface receiving the streaming service data at the network speed less than the threshold network speed, the station may not maintain the network speed which corresponds to the encoding bit rate applied to the streaming service, so the station performs an adjusting operation that controls a part of amount of streaming service data which are received through the radio access interface receiving the streaming service data at the network speed less than the threshold network speed to be received through another radio access interface receiving the streaming service data at a network speed which is greater than or equal to the threshold network speed. Here, in a case that the network speed corresponding to the encoding bit rate applied to the streaming service when the streaming service data is received through only the another radio access interface, the station may receive the streaming service data through only the another radio access interface.

Meanwhile, FIG. 8 focuses on a description of an operation of receiving a Wi-Fi chunk and an LTE chunk in a station, however, it will be noted that the station as described above performed an operation of requesting a corresponding chunk from a server already in order for receiving the Wi-Fi chunk and the LTE chunk as described in FIG. 8.

Although FIG. 8 illustrates an example of a stability guaranteeing process for a streaming service in a communication system supporting a plurality of radio access interfaces according to an embodiment of the present disclosure, various changes could be made to FIG. 8. For example, although shown as a series of operations, various operations in FIG. 8 could overlap, occur in parallel, occur in a different order, or occur multiple times.

An example of a stability guaranteeing process for a streaming service in a communication system supporting a plurality of radio access interfaces according to an embodiment of the present disclosure has been described with reference to FIG. 8, and another example of a stability guaranteeing process for a streaming service in a communication system supporting a plurality of radio access interfaces according to an embodiment of the present disclosure will be described with reference to FIG. 9.

Figure 9:
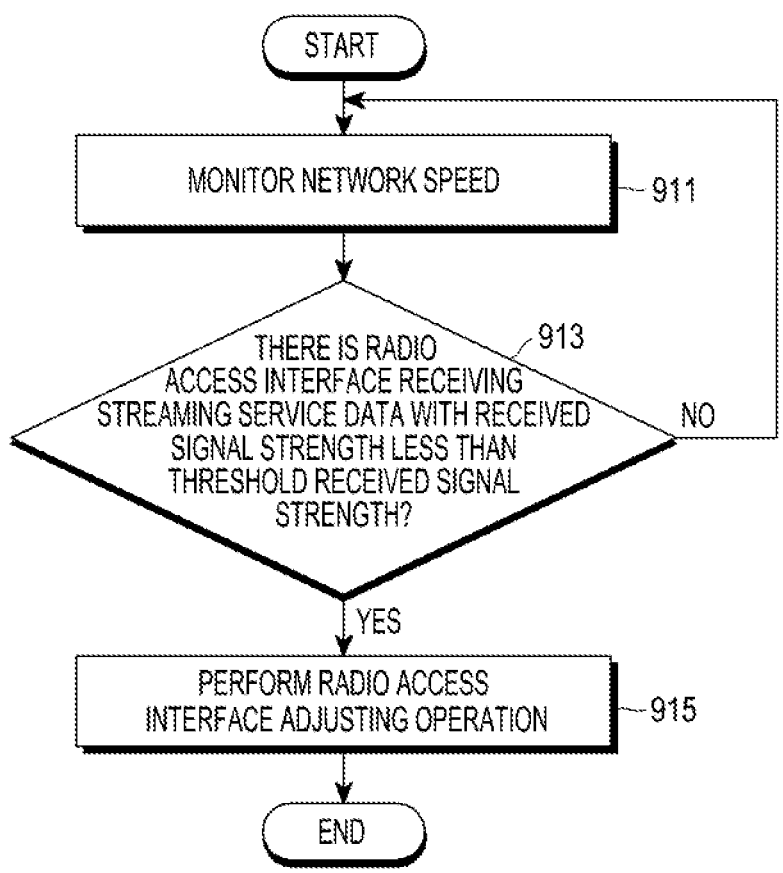
FIG. 9 schematically illustrates another example of a stability guaranteeing process for a streaming service in a communication system supporting a plurality of radio access interfaces according to an embodiment of the present disclosure.

FIG. 9 schematically illustrates another example of a stability guaranteeing process for a streaming service in a communication system supporting a plurality of radio access interfaces according to an embodiment of the present disclosure.

Referring to FIG. 9, as described above, in a case of a streaming service, it may be operated as an important factor affecting a service quality to maintain a network speed corresponding to an encoding bit rate applied to a streaming service in a server. So, received signal strength also affects a service quality, so a station needs to continuously monitor whether streaming service data is normally received through each radio access interface. Here, the received signal strength may be determined based on, for example, various metrics such as received signal code power (RSCP), reference signal received power (RSRP), a reference signal strength indicator (RSSI), a reference signal received quality (RSRQ), a carrier-to-interference noise ratio (CINR), a signal-to-noise ratio (SNR), a block error rate (BLER), and the like.

Firstly, the station monitors a network speed of each of radio access interfaces at step 911 and proceeds to step 913. That is, the station monitors the network speed of each of the radio access interfaces for checking whether corresponding chunks are received at a network speed determined at time that a chunk is requested upon receiving a segment at step 913. Here, it will be assumed that the monitor interval is maintained during preset time, e.g., 10 seconds or until a preset number of segments are received.

The station determines whether there is a radio access interface receiving streaming service data with received signal strength less than threshold received signal strength at step 913. Here, the threshold received signal strength may be appropriately set according to a situation of a mobile communication system, and an operation of setting the threshold received signal strength will be omitted herein.

If there is the radio access interface receiving the streaming service data with the received signal strength less than the threshold received signal strength, the station proceeds to step 915. At step 915, if the station receives the streaming service data through a radio access interface receiving the streaming service data with the received signal strength less than the threshold received signal strength, the station may not maintain the network speed which corresponds to the encoding bit rate applied to the streaming service, so the station performs an adjusting operation in which the station receives a part of streaming service data amount received through the radio access interface receiving the streaming service data with the received signal strength less than the threshold received signal strength through a radio access interface receiving the streaming service data with received signal strength greater than or equal to the threshold received signal strength. Here, in a case that the network speed which corresponds to the encoding bit rate applied to the streaming service may be maintained if the streaming service data is received through only the other radio access interface, the station may receive the streaming service data through only the other radio access interface.

Meanwhile, FIG. 9 focuses on a description of an operation of receiving a Wi-Fi chunk and an LTE chunk in a station, however, it will be noted that the station as described above performed an operation of requesting a corresponding chunk from a server already in order for receiving the Wi-Fi chunk and the LTE chunk as described in FIG. 9.

Although FIG. 9 illustrates another example of a stability guaranteeing process for a streaming service in a communication system supporting a plurality of radio access interfaces according to an embodiment of the present disclosure, various changes could be made to FIG. 9. For example, although shown as a series of operations, various operations in FIG. 9 could overlap, occur in parallel, occur in a different order, or occur multiple times.

Another example of a stability guaranteeing process for a streaming service in a communication system supporting a plurality of radio access interfaces according to an embodiment of the present disclosure has been described with reference to FIG. 9, and still another example of a stability guaranteeing process for a streaming service in a communication system supporting a plurality of radio access interfaces according to an embodiment of the present disclosure will be described with reference to FIG. 10.

Figure 10:
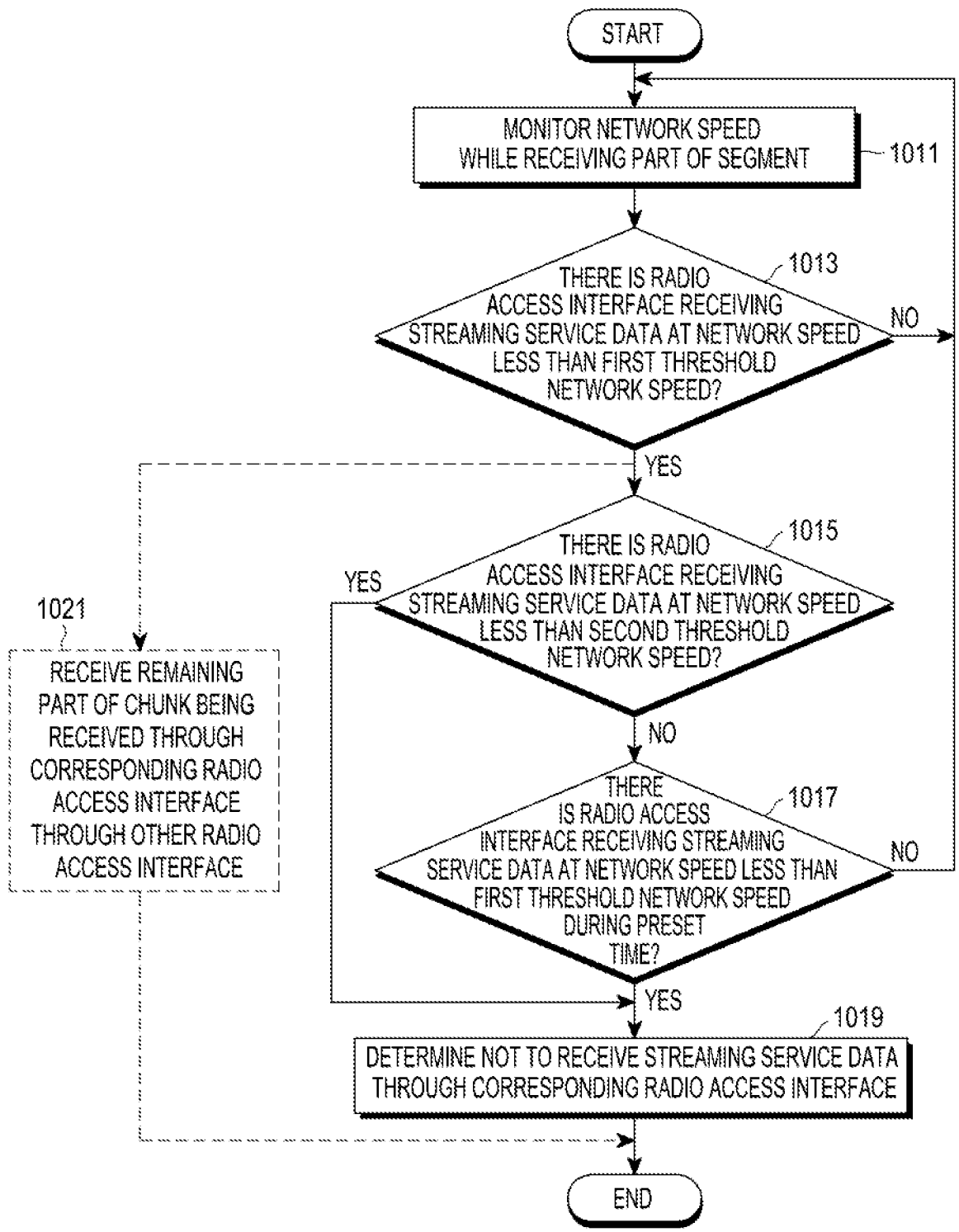
FIG. 10 schematically illustrates still another example of a stability guaranteeing process for a streaming service in a communication system supporting a plurality of radio access interfaces according to an embodiment of the present disclosure.

FIG. 10 schematically illustrates still another example of a stability guaranteeing process for a streaming service in a communication system supporting a plurality of radio access interfaces according to an embodiment of the present disclosure.

Referring to FIG. 10, as described above, in a case of a streaming service, it may be operated as an important factor affecting a service quality to maintain a network speed corresponding to an encoding bit rate applied to a streaming service in a server. So, a station needs to continuously monitor whether streaming service data is normally received through each radio access interface. In FIG. 10, a station monitors a network speed and available bandwidth of a corresponding radio access interface while receiving a chunk through each of radio access interfaces in order to maintain a network speed corresponding to an encoding bit rate applied to a streaming service.

Firstly, the station monitors a network speed of each of radio access networks while a part of a segment, i.e., a chunk through each of the radio access networks at step 1011 and proceeds to step 1013. That is, the station monitors the network speed of each of the radio access networks for checking whether corresponding chunks are received at a network speed as determined when the corresponding chunks are requested upon receiving a segment, and proceeds to step 1013. Here, it will be assumed that the monitor interval is maintained during preset time, e.g., 10 seconds or until a preset number of segments are received.

At step 1013, the station determines whether there is a radio access interface receiving streaming service data at a network speed less than the first threshold network speed. Here, the first threshold network speed may be set to the encoding bit rate applied to the streaming service, or a value which is less than the encoding bit rate by a preset value, e.g., β. Here, β may be greater than or equal to 0 (62 ≥0). Here, the first threshold network speed may be set to an arbitrary value.

If there is the radio access interface receiving the streaming service data at the network speed less than the first threshold network speed, the station proceeds to step 1015. Here, the station requests to the server such that the station may receive a remaining part, i.e., a part to be received among a chunk which is receiving through a radio access interface receiving the streaming service data through a radio access interface other than the radio access interface receiving the streaming service data at the network speed less than the first threshold network speed. Here, the request may be performed using an HTTP range request message.

If the other radio access interface receives the streaming service data already, the other radio access interface may additionally establish an HTTP session with the server, and receive the remaining part of the streaming service data, i.e., the chunk from the server through the additionally established HTTP session at step 1021. Here, an available bandwidth of the other radio access interface at least needs to be guaranteed such that the other radio access interface may receive the remaining part of the chunk. If the available bandwidth of the other radio access interface is not guaranteed such that the other radio access interface may receive the remaining part of the chunk, the additional HTTP session is not established.

The station determines whether there is a radio access interface receiving the streaming service data at a network speed less than the second threshold network speed among radio access interfaces receiving the streaming service data at the first threshold network speed at step 1015. Here, the second threshold network speed may be set to a value less than the first threshold network speed. If there is no radio access interface receiving the streaming service data at the network speed less than the second threshold network speed, the station proceeds to step 1017.

The station determines whether the radio access interface receiving the streaming service data at the network speed less than the first threshold network speed receives the streaming service data at the network speed less than the first threshold network speed during preset time at step 1017. If the radio access interface receiving the streaming service data at the network speed less than the first threshold network speed does not receive the streaming service data at the network speed less than the first threshold network speed during the preset time, the station returns to step 1011.

If the radio access interface receiving the streaming service data at the network speed less than the first threshold network speed receives the streaming service data at the network speed less than the first threshold network speed during the preset time, the station proceeds to step 1019. The station determines not to receive the streaming service through a corresponding radio access interface at step 1019. That is, the station terminates an HTTP session established between the corresponding radio access interface and the server at step 1019. So, thereafter, the station receives the streaming service data through only radio access interfaces other than the radio access interface of which the HTTP session is terminated.

If there is the radio access interface receiving the streaming service data at the network speed less than the second threshold network speed at step 1015, the station proceeds to step 1019. The station determines not to receive the streaming service through a corresponding radio access interface at step 1019. That is, the station terminates an HTTP session established between the corresponding radio access interface and the server at step 1019. So, thereafter, the station receives the streaming service data through only radio access interfaces other than the radio access interface of which the HTTP session is terminated.

For example, a case that a corresponding HTTP session is terminated if it is determined not to receive a streaming service through a corresponding radio access interface has been described in FIG. 10. Further, a corresponding HTTP session is terminated and a chunk which corresponds to threshold streaming service data amount may be continuously requested and received for future use for the corresponding interface in a case that it is determined not to receive the streaming service through the corresponding radio access interface. Here, the threshold streaming service data amount may be set to amount suitable for checking a keep-alive state for a corresponding HTTP session.

In a process as described in FIG. 10, in a case that use of the radio access interface of which the HTTP session is terminated is possible after reception of a corresponding segment has been completed, the station may receive streaming service data through the radio access interface of which the HTTP session is terminated again. In this case, the time during which the streaming service data is received at the network speed less than the first threshold network speed detected at step 1018 is reset.

Meanwhile, FIG. 10 focuses on a description of an operation of receiving a chunk in a station, however, it will be noted that the station as described above performed an operation of requesting a corresponding chunk from a server already in order for receiving the chunk as described in FIG. 10.

Although FIG. 10 illustrates still another example of a stability guaranteeing process for a streaming service in a communication system supporting a plurality of radio access interfaces according to an embodiment of the present disclosure, various changes could be made to FIG. 10. For example, although shown as a series of operations, various operations in FIG. 10 could overlap, occur in parallel, occur in a different order, or occur multiple times.

Figure 11:
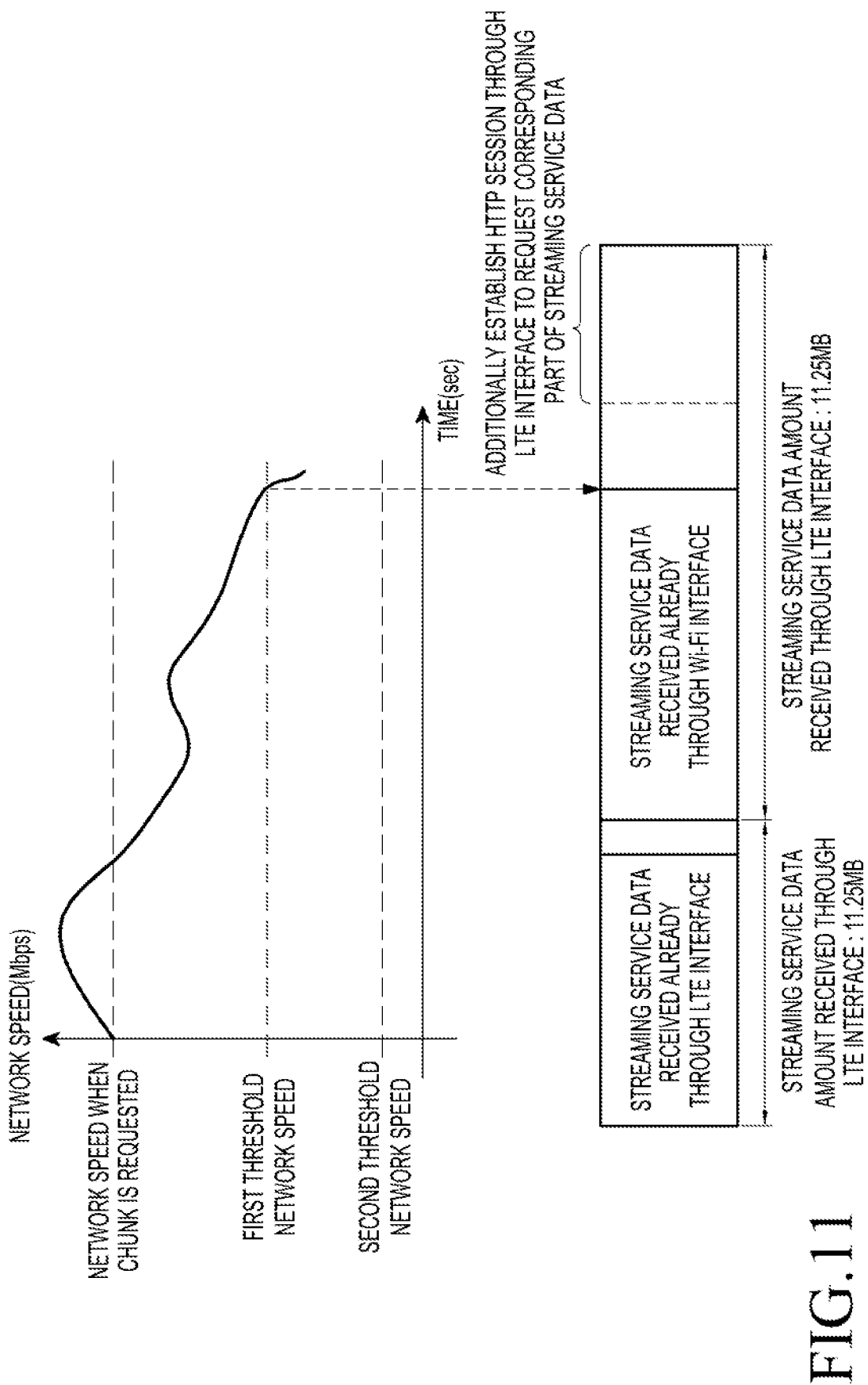
FIG. 11 schematically illustrates relation among a network speed and radio access interfaces according to still another example of a stability guaranteeing process for a streaming service in a communication system supporting a plurality of radio access interfaces as shown in FIG. 10.

Still another example of a stability guaranteeing process for a streaming service in a communication system supporting a plurality of radio access interfaces according to an embodiment of the present disclosure has been described with reference to FIG. 10, and relation among a network speed and radio access interfaces according to still another example of a reliability guaranteeing process for a streaming service in a communication system supporting a plurality of radio access interfaces as shown in FIG. 10 will be described with reference to FIG. 11. FIG. 11 schematically illustrates relation among a network speed and radio access interfaces according to still another example of a stability guaranteeing process for a streaming service in a communication system supporting a plurality of radio access interfaces as shown in FIG. 10.

Referring to FIG. 11, relation between a network speed and radio access interfaces as shown in FIG. 11 indicates relation between a network speed and radio access interfaces in a case that radio access interfaces are used as described in FIG. 10. That is, relation between a network speed and radio access interfaces as shown in FIG. 11 indicates relation between a network speed and radio access interfaces, i.e., a Wi-Fi interface and an LTE interface may be determined based on the first threshold network speed and the second threshold network speed as described in FIG. 10.

Relation among a network speed and radio access interfaces according to still another example of a stability guaranteeing process for a streaming service in a communication system supporting a plurality of radio access interfaces as shown in FIG. 10 has been described with reference to FIG. 11, and a process of differently setting a network speed per radio access interface as still another example of a stability guaranteeing process for a streaming service in a communication system supporting a plurality of radio access interfaces will be described below.

Firstly, a threshold network speed for a radio access interface receiving a chunk may be set to an encoding bit rate applied to video content. The reason why the threshold network speed for the radio access interface receiving the chunk may be set to the encoding bit rate applied to the video content will be described below.

Firstly, the first chunk is transferred to a video player application, and the video player application does not perform a playback operation if the video player application is not capable of reading video contents which correspond to an encoding bit rate applied to the video content. For example, in a case that the first chunk is received through an LTE interface, if a network speed of the LTE interface is greater than or equal to the encoding bit rate applied to the video content, there is no need for an operation for guaranteeing stability. Secondly, a threshold network speed for a radio access interface receiving a chunk may be determined after the first chunk is received. The second chunk is buffered while the first chunk is read, the second chunk is buffered while the first chunk is read at a video player application. So, a problem does not occur while the second chunk is buffered even though a network speed of a radio access interface receiving the second chunk is relatively slow. So, if download for the second chunk has not been completed and a speed of the radio access interface receiving the second chunk does not satisfies a criterion as expressed in Equation 10 after download for the first chunk has been completed, a stability guaranteeing operation is performed. That is, a threshold network speed of a radio access interface receiving the second chunk may be set as expressed in Equation 10.

$$TH\sec = \frac{S}{T} \quad \text{[Equation 10]}$$

In Equation (10), THsec denotes a threshold network speed for the radio access interface receiving the second chunk, S denotes amount of remaining streaming service data which is not received among the second chunk, and T denotes time until which reception for streaming service data which corresponds to the S needs to be completed, i.e., time until which download for the streaming service data which corresponds to the S needs to be completed.

Further, the T may be expressed as Equation 11.

$$T = \frac{\text{total size of the second chunk}}{\text{videobitrate}} - \frac{\text{time consumed for received streaming service among the second chunk}} \quad \text{[Equation 11]}$$

Figure 12:
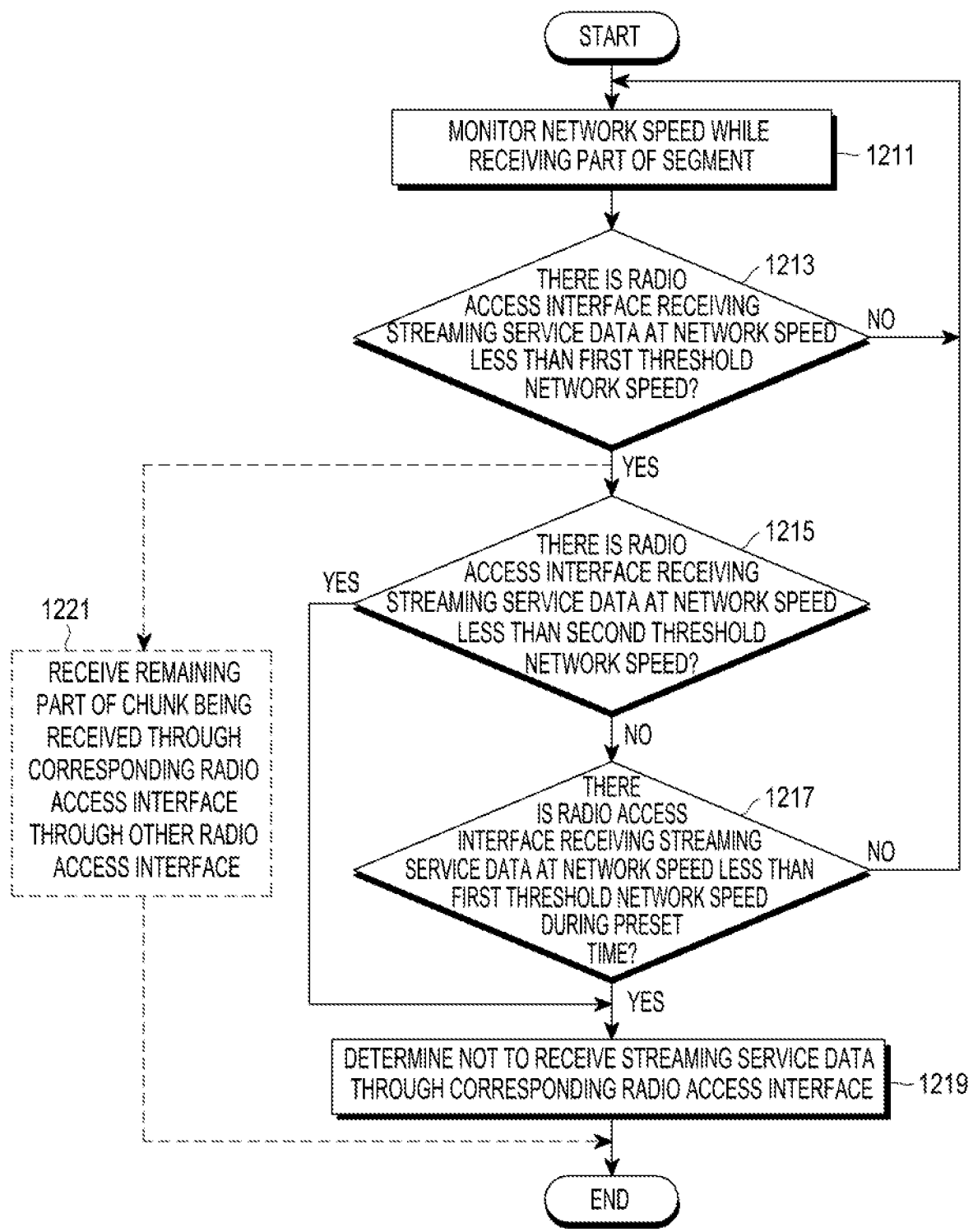
FIG. 12 schematically illustrates still another example of a stability guaranteeing process for a streaming service in a communication system supporting a plurality of radio access interfaces according to an embodiment of the present disclosure.

A process of differently setting a network speed per radio access interface as still another example of a stability guaranteeing process for a streaming service in a communication system supporting a plurality of radio access interfaces has been described above, and still another example of a stability guaranteeing process for a streaming service in a communication system supporting a plurality of radio access interfaces according to an embodiment of the present disclosure will be described with reference to FIG. 12.

FIG. 12 schematically illustrates still another example of a stability guaranteeing process for a streaming service in a communication system supporting a plurality of radio access interfaces according to an embodiment of the present disclosure.

Referring to FIG. 12, as described above, in a case of a streaming service, it may be operated as an important factor affecting a service quality to maintain a network speed corresponding to an encoding bit rate applied to a streaming service in a server. So, a station needs to continuously monitor whether streaming service data is normally received through each radio access interface. In FIG. 12, a station monitors a network speed and available bandwidth of a corresponding radio access interface while receiving a chunk through each of radio access interfaces in order to maintain a network speed corresponding to the encoding bit rate applied to the streaming service.

Firstly, the station monitors a network speed and an available bandwidth of each of radio access networks while receiving a part of a segment, i.e., a chunk through each of the radio access networks at step 1211 and proceeds to step 1213. That is, the station monitors the network speed and the available bandwidth of each of the radio access networks for checking whether corresponding chunks are received at a network speed as determined when the corresponding chunks are requested upon receiving a segment, and proceeds to step 1213. Here, it will be assumed that the monitor interval is maintained during preset time, e.g., 10 seconds or until a preset number of segments are received.

At step 1213, the station determines whether there is a radio access interface receiving streaming service data at a network speed less than the first threshold network speed. Here, the first threshold network speed may be set to the encoding bit rate applied to the streaming service, or a value which is less than the encoding bit rate by a preset value, e.g., β. Here, β may be greater than or equal to 0 (β≥0). Here, the first threshold network speed may be set to an arbitrary value.

If there is the radio access interface receiving the streaming service data at the network speed less than the first threshold network speed, the station proceeds to step 1215. Here, the station requests to the server such that the station may receive a chunk which is receiving through the radio access interface receiving the streaming service data at the network speed less than the first threshold network speed through a radio access interface other than the radio access interface receiving the streaming service data at the network speed less than the first threshold network speed. Here, the request may be performed using an HTTP range request message.

If the other radio access interface receives the streaming service data already, the other radio access interface may additionally establish an HTTP session with the server, and receive the streaming service data, i.e., the chunk from the server through the additionally established HTTP session at step 1221. Here, an available bandwidth of the other radio access interface at least needs to be guaranteed such that the other radio access interface may receive the chunk. If the available bandwidth of the other radio access interface is not guaranteed such that the other radio access interface may receive the remaining part of the chunk, the additional HTTP session is not established. As a result, in FIG. 12, a station receives the same chunk through a plurality of radio access interfaces in order to guarantee stability for reception of the streaming service. That is, the station guarantees the stability for the reception of the streaming service by receiving a corresponding chunk through the other radio access interface even though the radio access interface receiving the streaming service data at the first threshold network speed receives the corresponding chunk.

The station determines whether there is a radio access interface receiving the streaming service data at the second threshold network speed among radio access interfaces receiving the streaming service data at the first threshold network speed at step 1215. Here, the second threshold network speed may be set to a value less than the first threshold network speed. If there is no radio access interface receiving the streaming service data at the network speed less than the second threshold network speed, the station proceeds to step 1217.

The station determines whether the radio access interface receiving the streaming service data at the network speed less than the first threshold network speed receives the streaming service data at the network speed less than the first threshold network speed during preset time at step 1217. If the radio access interface receiving the streaming service data at the network speed less than the first threshold network speed does not receive the streaming service data at the network speed less than the first threshold network speed during the preset time, the station returns to step 1211.

If the radio access interface receiving the streaming service data at the network speed less than the first threshold network speed receives the streaming service data at the network speed less than the first threshold network speed during the preset time, the station proceeds to step 1219. The station determines not to receive the streaming service through a corresponding radio access interface at step 1219. That is, the station terminates an HTTP session established between the corresponding radio access interface and the server at step 1219. So, thereafter, the station receives the streaming service data through only radio access interfaces other than the radio access interface of which the HTTP session is terminated.

If there is the radio access interface receiving the streaming service data at the network speed less than the second threshold network speed at step 1215, the station proceeds to step 1219. The station determines not to receive the streaming service through a corresponding radio access interface at step 1219. That is, the station terminates an HTTP session established between the corresponding radio access interface and the server at step 1219. So, thereafter, the station receives the streaming service data through only radio access interfaces other than the radio access interface of which the HTTP session is terminated.

For example, a case that a corresponding HTTP session is terminated if it is determined not to receive a streaming service through a corresponding radio access interface has been described in FIG. 12. Further, a corresponding HTTP session is terminated and a chunk which corresponds to threshold streaming service data amount may be continuously requested and received for future use for the corresponding interface in a case that it is determined not to receive the streaming service through the corresponding radio access interface. Here, the threshold streaming service data amount may be set to amount suitable for checking a keep-alive state for a corresponding HTTP session.

In a process as described in FIG. 12, in a case that use of the radio access interface of which the HTTP session is terminated is possible after reception of a corresponding segment has been completed, the station can receive streaming service data through the radio access interface of which the HTTP session is terminated again. In this case, the time during which the streaming service data is received at the network speed less than the first threshold network speed detected at step 1217 is reset.

Meanwhile, FIG. 12 focuses on a description of an operation of receiving a chunk in a station, however, it will be noted that the station as described above performed an operation of requesting a corresponding chunk from a server already in order for receiving the chunk as described in FIG. 12.

Although FIG. 12 illustrates still another example of a stability guaranteeing process for a streaming service in a communication system supporting a plurality of radio access interfaces according to an embodiment of the present disclosure, various changes could be made to FIG. 12. For example, although shown as a series of operations, various operations in FIG. 12 could overlap, occur in parallel, occur in a different order, or occur multiple times.

Still another example of a stability guaranteeing process for a streaming service in a communication system supporting a plurality of radio access interfaces according to an embodiment of the present disclosure has been described with reference to FIG. 12, and still another example of a stability guaranteeing process for a streaming service in a communication system supporting a plurality of radio access interfaces according to an embodiment of the present disclosure will be described with reference to FIG. 13.

Figure 13:
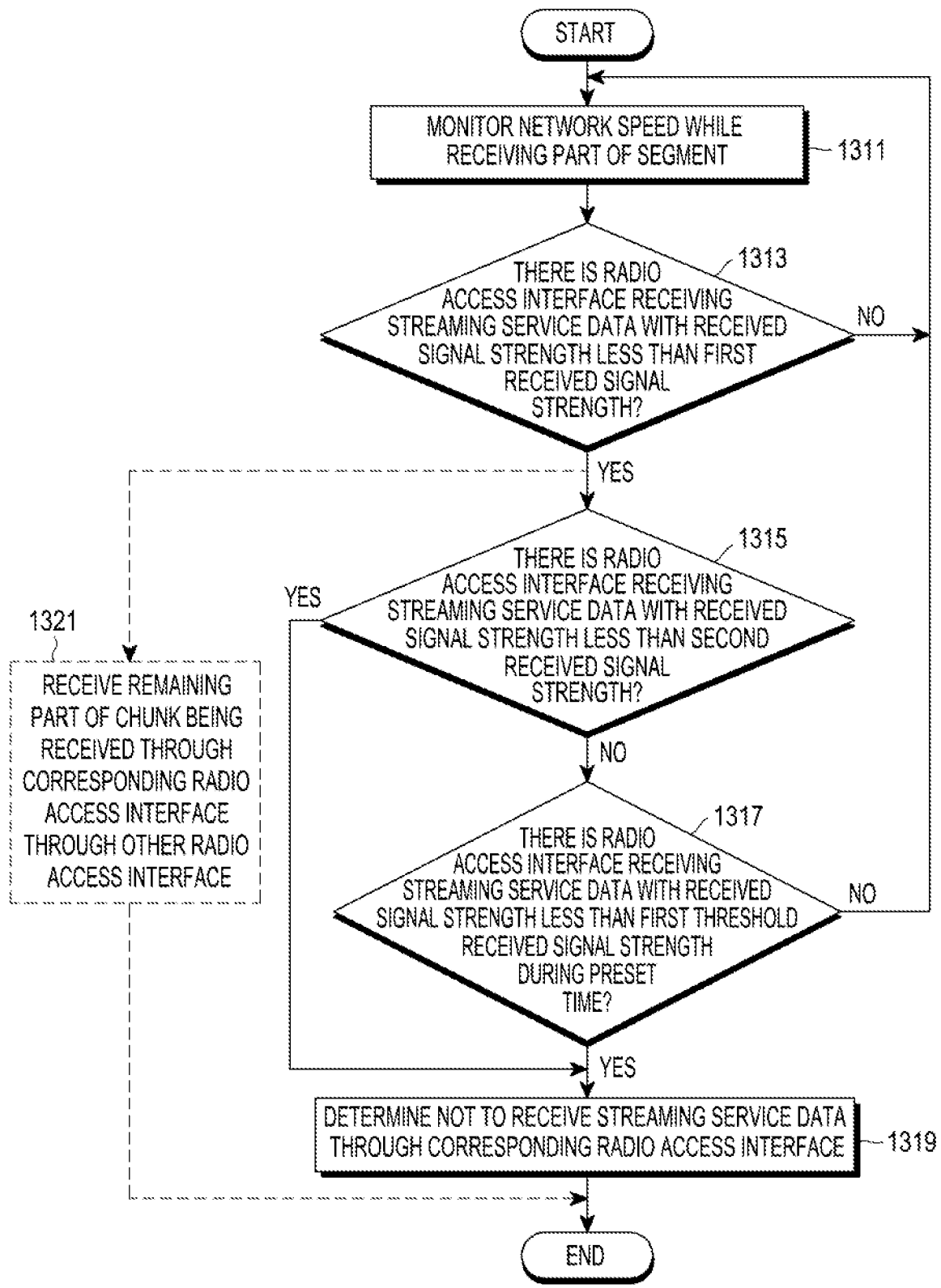
FIG. 13 schematically illustrates still another example of a stability guaranteeing process for a streaming service in a communication system supporting a plurality of radio access interfaces according to an embodiment of the present disclosure.

FIG. 13 schematically illustrates still another example of a stability guaranteeing process for a streaming service in a communication system supporting a plurality of radio access interfaces according to an embodiment of the present disclosure.

Referring to FIG. 13, as described above, in a case of a streaming service, it may be operated as an important factor affecting a service quality to maintain a network speed corresponding to an encoding bit rate applied to a streaming service in a server. So, a station needs to continuously monitor whether streaming service data is normally received through each radio access interface. In FIG. 13, a station monitors received signal strength of each of radio access interfaces in order to maintain a network speed corresponding to an encoding bit rate applied to a streaming service.

Firstly, the station monitors received signal strength of each of radio access networks at step 1311 and proceeds to step 1313. That is, the station monitors the received signal strength of each of the radio access networks for checking whether corresponding chunks are received at a network speed as determined when the corresponding chunks are requested upon receiving a segment, and proceeds to step 1313. Here, it will be assumed that the monitor interval is maintained during preset time, e.g., 10 seconds or until a preset number of segments are received.

At step 1313, the station determines whether there is a radio access interface receiving streaming service data with received signal strength less than the first threshold received signal strength. Here, the first threshold received signal strength may be set appropriate to a situation of a mobile communication system, and a detailed description of an operation of setting the first threshold received signal strength will be omitted herein. Further, the first threshold received signal strength may be set to an arbitrary value.

If there is the radio access interface receiving the streaming service data with the received signal strength less than the first threshold received signal strength, the station proceeds to step 1315. Here, the station requests to the server such that the station may receive a remaining part, i.e., a part to be received among a chunk which is receiving through a radio access interface receiving the streaming service data with the received signal strength less than the first received signal strength through a radio access interface other than the radio access interface receiving the streaming service data with the received signal strength less than the first received signal strength. Here, the request may be performed using an HTTP range request message.

If the other radio access interface receives the streaming service data already, the other radio access interface may additionally establish an HTTP session with the server, and receive the remaining part of the streaming service data, i.e., the chunk from the server through the additionally established HTTP session at step 1321. Here, an available bandwidth of the other radio access interface at least needs to be guaranteed such that the other radio access interface may receive the remaining part of the chunk. If the available bandwidth of the other radio access interface is not guaranteed such that the other radio access interface may receive the remaining part of the chunk, the additional HTTP session is not established.

The station determines whether there is a radio access interface receiving the streaming service data with the second threshold received signal strength among radio access interfaces receiving the streaming service data with the first threshold received signal strength at step 1315. Here, the second threshold received signal strength may be set to a value less than the first threshold received signal strength. If there is no radio access interface receiving the streaming service data with the received signal strength less than the second threshold received signal strength, the station proceeds to step 1317.

The station determines whether the radio access interface receiving the streaming service data with the received signal strength less than the first threshold received signal strength receives the streaming service data with the received signal strength less than the first threshold received signal strength during preset time at step 1317. If the radio access interface receiving the streaming service data with the received signal strength less than the first threshold received signal strength does not receive the streaming service data with the received signal strength less than the first threshold received signal strength during the preset time, the station returns to step 1311.

If the radio access interface receiving the streaming service data with the received signal strength less than the first threshold received signal strength receives the streaming service data with the received signal strength less than the first threshold received signal strength during the preset time, the station proceeds to step 1319. The station determines not to receive the streaming service through a corresponding radio access interface at step 1319. That is, the station terminates an HTTP session established between the corresponding radio access interface and the server at step 1319. So, thereafter, the station receives the streaming service data through only radio access interfaces other than the radio access interface of which the HTTP session is terminated.

If there is the radio access interface receiving the streaming service data with the received signal strength less than the second threshold received signal strength at step 1315, the station proceeds to step 1319. The station determines not to receive the streaming service through a corresponding radio access interface at step 1319. That is, the station terminates an HTTP session established between the corresponding radio access interface and the server at step 1319. So, thereafter, the station receives the streaming service data through only radio access interfaces other than the radio access interface of which the HTTP session is terminated.

For example, a case that a corresponding HTTP session is terminated if it is determined not to receive a streaming service through a corresponding radio access interface has been described in FIG. 13. Further, a corresponding HTTP session is terminated and a chunk which corresponds to threshold streaming service data amount may be continuously requested and received for future use for the corresponding interface in a case that it is determined not to receive the streaming service through the corresponding radio access interface. Here, the threshold streaming service data amount may be set to amount suitable for checking a keep-alive state for a corresponding HTTP session.

In a process as described in FIG. 13, in a case that use of the radio access interface of which the HTTP session is terminated is possible after reception of a corresponding segment has been completed, the station may receive streaming service data through the radio access interface of which the HTTP session is terminated again. In this case, the time during which the streaming service data is received with the received signal strength less than the first threshold received signal strength detected at step 1317 is reset.

Meanwhile, FIG. 13 focuses on a description of an operation of receiving a chunk in a station, however, it will be noted that the station as described above performed an operation of requesting a corresponding chunk from a server already in order for receiving the chunk as described in FIG. 13.

Although FIG. 13 illustrates still another example of a stability guaranteeing process for a streaming service in a communication system supporting a plurality of radio access interfaces according to an embodiment of the present disclosure, various changes could be made to FIG. 13. For example, although shown as a series of operations, various operations in FIG. 13 could overlap, occur in parallel, occur in a different order, or occur multiple times.

Still another example of a stability guaranteeing process for a streaming service in a communication system supporting a plurality of radio access interfaces according to an embodiment of the present disclosure has been described with reference to FIG. 13, and still another example of a stability guaranteeing process for a streaming service in a communication system supporting a plurality of radio access interfaces according to an embodiment of the present disclosure will be described with reference to FIG. 14.

Figure 14:
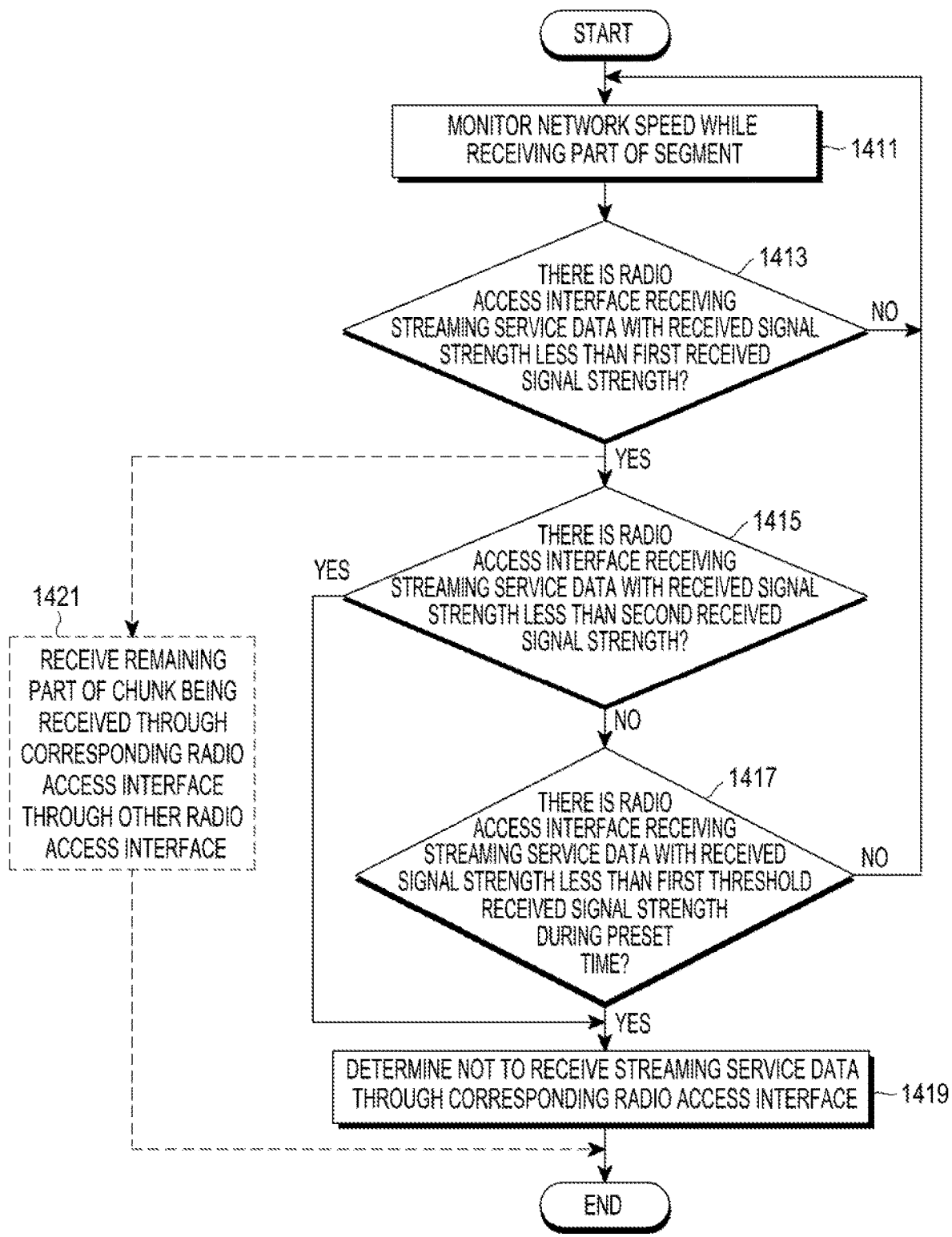
FIG. 14 schematically illustrates still another example of a stability guaranteeing process for a streaming service in a communication system supporting a plurality of radio access interfaces according to an embodiment of the present disclosure.

FIG. 14 schematically illustrates still another example of a stability guaranteeing process for a streaming service in a communication system supporting a plurality of radio access interfaces according to an embodiment of the present disclosure.

Referring to FIG. 14, as described above, in a case of a streaming service, it may be operated as an important factor affecting a service quality to maintain a network speed corresponding to an encoding bit rate applied to a streaming service in a server. So, a station needs to continuously monitor whether streaming service data is normally received through each radio access interface. In FIG. 14, a station monitors received signal strength of each of radio access interfaces in order to maintain a network speed corresponding to an encoding bit rate applied to a streaming service.

Firstly, the station monitors received signal strength of each of radio access networks at step 1411 and proceeds to step 1413. That is, the station monitors the received signal strength of each of the radio access networks for checking whether corresponding chunks are received at a network speed as determined when the corresponding chunks are requested upon receiving a segment, and proceeds to step 1413. Here, it will be assumed that the monitor interval is maintained during preset time, e.g., 10 seconds or until a preset number of segments are received.

At step 1413, the station determines whether there is a radio access interface receiving streaming service data with received signal strength less than the first threshold received signal strength. Here, the first threshold received signal strength may be set appropriate to a situation of a mobile communication system, and a detailed description of an operation of setting the first threshold received signal strength will be omitted herein. Further, the first threshold received signal strength may be set to an arbitrary value.

If there is the radio access interface receiving the streaming service data with the received signal strength less than the first threshold received signal strength, the station proceeds to step 1415. Here, the station requests to the server that the station enables to receive a chunk which is receiving through a radio access interface receiving the streaming service data with received signal strength less than the first received signal strength through a radio access interface other than the radio access interface receiving the streaming service data with the received signal strength less than the first received signal strength. Here, the request may be performed using an HTTP range request message.

If the other radio access interface receives the streaming service data already, the other radio access interface may additionally establish an HTTP session with the server, and receive the streaming service data, i.e., the chunk from the server through the additionally established HTTP session at step 1421. Here, an available bandwidth of the other radio access interface at least needs to be guaranteed such that the other radio access interface may receive the chunk. If the available bandwidth of the other radio access interface is not guaranteed such that the other radio access interface may receive the remaining part of the chunk, the additional HTTP session is not established. As a result, in FIG. 14, a station receives the same chunk through a plurality of radio access interfaces in order to guarantee stability for reception of a streaming service. That is, the station guarantees the stability for the reception of the streaming service by receiving a corresponding chunk through other radio access interface even though the radio access interface receiving the streaming service data with the first threshold received signal strength receives the corresponding chunk.

The station determines whether there is a radio access interface receiving the streaming service data with the second threshold received signal strength among radio access interfaces receiving the streaming service data with the first threshold received signal strength at step 1415. Here, the second threshold received signal strength may be set to a value less than the first threshold received signal strength. If there is no radio access interface receiving the streaming service data with the received signal strength less than the second threshold received signal strength, the station proceeds to step 1417.

The station determines whether the radio access interface receiving the streaming service data with the received signal strength less than the first threshold received signal strength receives the streaming service data with the received signal strength less than the first threshold received signal strength during preset time at step 1417. If the radio access interface receiving the streaming service data with the received signal strength less than the first threshold received signal strength does not receive the streaming service data with the received signal strength less than the first threshold received signal strength during the preset time, the station returns to step 1411.

If the radio access interface receiving the streaming service data with the received signal strength less than the first threshold received signal strength receives the streaming service data with the received signal strength less than the first threshold received signal strength during the preset time, the station proceeds to step 1419. The station determines not to receive the streaming service through a corresponding radio access interface at step 1419. That is, the station terminates an HTTP session established between the corresponding radio access interface and the server at step 1419. So, thereafter, the station receives the streaming service data through only radio access interfaces other than the radio access interface of which the HTTP session is terminated.

If there is the radio access interface receiving the streaming service data with the received signal strength less than the second threshold received signal strength at step 1415, the station proceeds to step 1419. The station determines not to receive the streaming service through a corresponding radio access interface at step 1419. That is, the station terminates an HTTP session established between the corresponding radio access interface and the server at step 1419. So, thereafter, the station receives the streaming service data through only radio access interfaces other than the radio access interface of which the HTTP session is terminated.

For example, a case that a corresponding HTTP session is terminated if a streaming service is not received through a corresponding radio access interface has been described in FIG. 14. Further, a corresponding HTTP session is terminated and a chunk which corresponds to threshold streaming service data amount may be continuously requested and received for future use for the corresponding interface in a case of determining not to receive the streaming service through the corresponding radio access interface. Here, the threshold streaming service data amount may be set to amount suitable for checking a keep-alive state for a corresponding HTTP session.

In a process as described in FIG. 14, in a case that use of the radio access interface of which the HTTP session is terminated is possible after reception of a corresponding segment has been completed, the station may receive streaming service data through the radio access interface of which the HTTP session is terminated again. In this case, the time for which the streaming service data has been received with the received signal strength less than the first threshold received signal strength detected at step 1417 is reset.

Meanwhile, FIG. 14 focuses on a description of an operation of receiving a chunk in a station, however, it will be noted that the station as described above performed an operation of requesting a corresponding chunk from a server already in order for receiving the chunk as described in FIG. 14.

Although FIG. 14 illustrates still another example of a reliability guaranteeing process for a streaming service in a communication system supporting a plurality of radio access interfaces according to an embodiment of the present disclosure, various changes could be made to FIG. 14. For example, although shown as a series of operations, various operations in FIG. 14 could overlap, occur in parallel, occur in a different order, or occur multiple times.

Still another example of a reliability guaranteeing process for a streaming service in a communication system supporting a plurality of radio access interfaces according to an embodiment of the present disclosure has been described with reference to FIG. 14, and a process of receiving streaming service data such that high-definition video content may be played from playback start time in a communication system supporting a plurality of radio access interfaces according to an embodiment of the present disclosure will be described with reference to FIGS. 15 to 17.

Firstly, a process of receiving streaming service data in a case that an HTTP AS protocol is used in a communication system supporting a plurality of radio access interfaces according to an embodiment of the present disclosure will be described with reference to FIG. 15.

Figure 15:
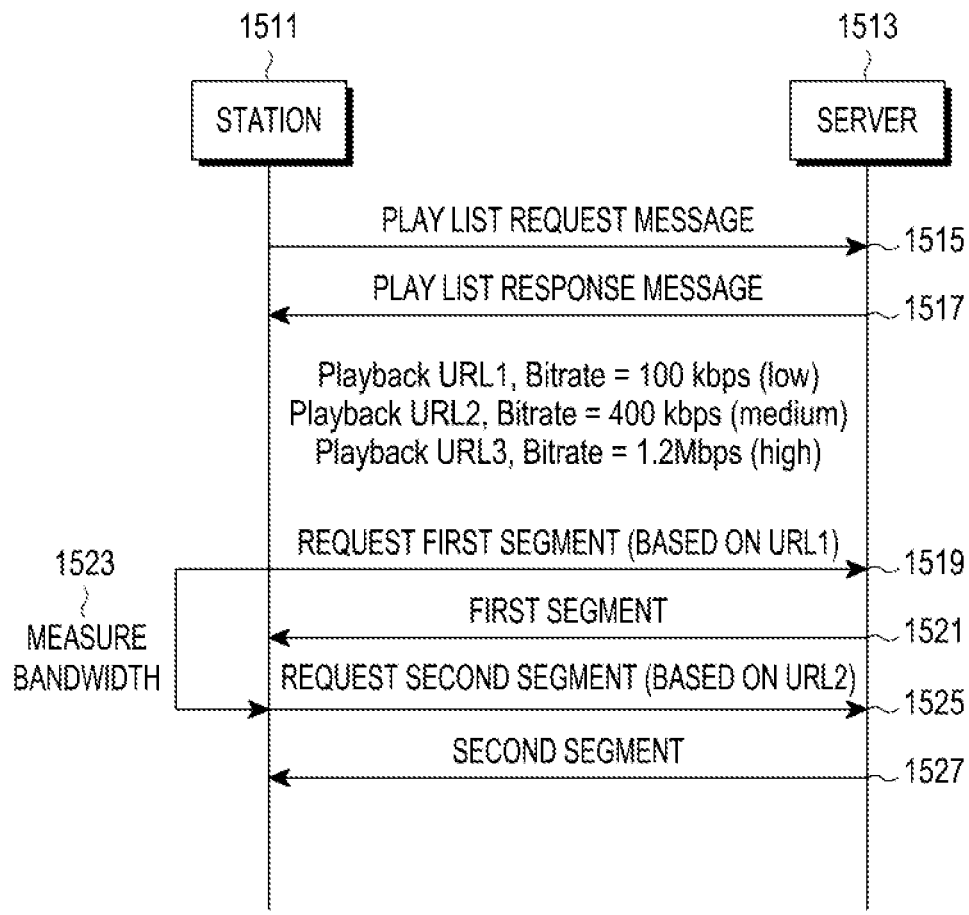
FIG. 15 schematically illustrates a process of receiving streaming service data in a case that an HTTP AS protocol is used in a communication system supporting a plurality of radio access interfaces according to an embodiment of the present disclosure.

FIG. 15 schematically illustrates a process of receiving streaming service data in a case that an HTTP AS protocol is used in a communication system supporting a plurality of radio access interfaces according to an embodiment of the present disclosure.

Referring to FIG. 15, the communication system includes a station 1511 and a server 1513.

Firstly, the station 1511 transmits a play list request message to request a play list to the server 1513 at step 1515. After receiving the play list request message from the station 1511, the server 1513 transmits a play list response message as a response message to the play list request message to the station 1511 at step 1517. Here, the play list response message includes a play list. Here, the play list includes a uniform resource indicator (URL) for playing corresponding video content and encoding bit rate information applied to the video content. For example, the play list may be expressed as the following.

<Play List>
Playback URL1, Bitrate=100 kbps (low)
Playback URL2, Bitrate=400 kbps (medium)
Playback URL3, Bitrate=1.2 Mbps (high)

In the play list, Playback URL indicates a URL for video content, and Bitrate indicates an encoding bit rate information applied to the video content.

After receiving the play list response message from the server 1513, the station 1511 selects the lowest URL, i.e., a URL 1 which corresponds to an encoding bit rate applied to video content since the station 1511 does not initially have bandwidth information for a used network, and transmits a message, e.g., an HTTP range message to request to transmit the first segment to the server 1513 based on information of the URL1 at step 1519.

After receiving the HTTP range message to request to transmit the first segment from the station 1511, the server 1513 transmits the first segment which corresponds to the URL1 to the station 1511 at step 1521. After receiving the first segment from the server 1513, the station 1511 measures a bandwidth while receiving the first segment at step 1523.

So, if the station 1511 transmits an HTTP range message to request to the next segment, i.e., the second segment, the station 1511 selects a URL from the play list based on the measured bandwidth. For example, the bandwidth measured by the station 1511 is 500 kbps, the station 1511 selects a URL2. Then, the station 1511 transmits a message, e.g., an HTTP range message to request to transmit the second segment to the server 1513 based on information of the selected URL2 at step 1525. Until a termination request for playback of corresponding video content is detected, an operation corresponding to steps 1523 and 1525 is repetitively performed.

If a Wi-Fi interface and LTE interface are connected at the same time, and a bandwidth of the Wi-Fi interface is relatively low, for example, the bandwidth of the Wi-Fi interface is 500 Kbps less than a threshold bandwidth, a station plays low-definition video content through the Wi-Fi interface even though the station may watch high-definition video content through the LTE interface. That is, a bandwidth of the Wi-Fi interface is 500 Kbps, so it is inevitable that the station always plays video content of 400 Kbps.

So, an embodiment of the present disclosure proposes a scheme of requesting to transit a corresponding segment using an LTE interface until an encoding bit rate applied to video content of the corresponding segment becomes a maximum bit rate if an encoding bit rate applied to video content of a segment for which transmission is currently requested is not the highest bit rate and receiving the corresponding segment based on the request. Here, the highest bit rate may be adaptively set according to a situation of a communication system which uses a plurality of radio access interfaces.

A process of receiving streaming service data such that high-definition video content may be played from playback start time in a mobile communication system supporting a plurality of radio access interfaces according to an embodiment of the present disclosure will be described with reference to FIGS. 16a and 16b.

Figure 16A:
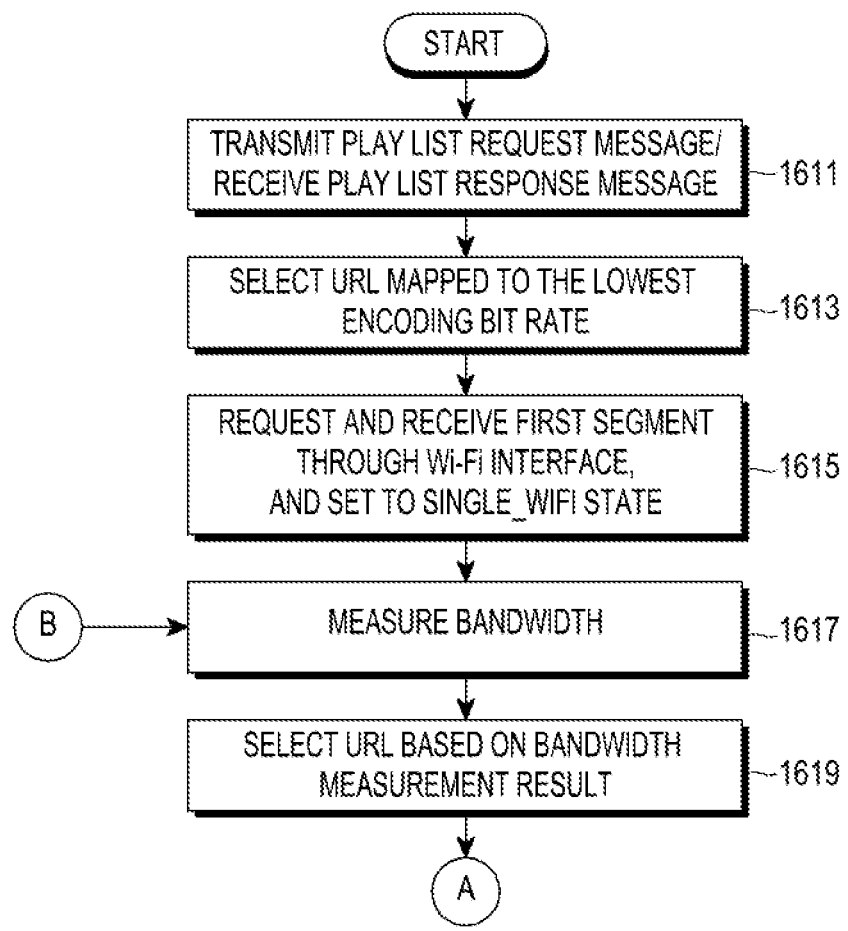
FIGS. 16a and 16b schematically illustrate a process of receiving streaming service data such that high-definition video content may be played from playback start time in a mobile communication system supporting a plurality of radio access interfaces according to an embodiment of the present disclosure.
Figure 16B:
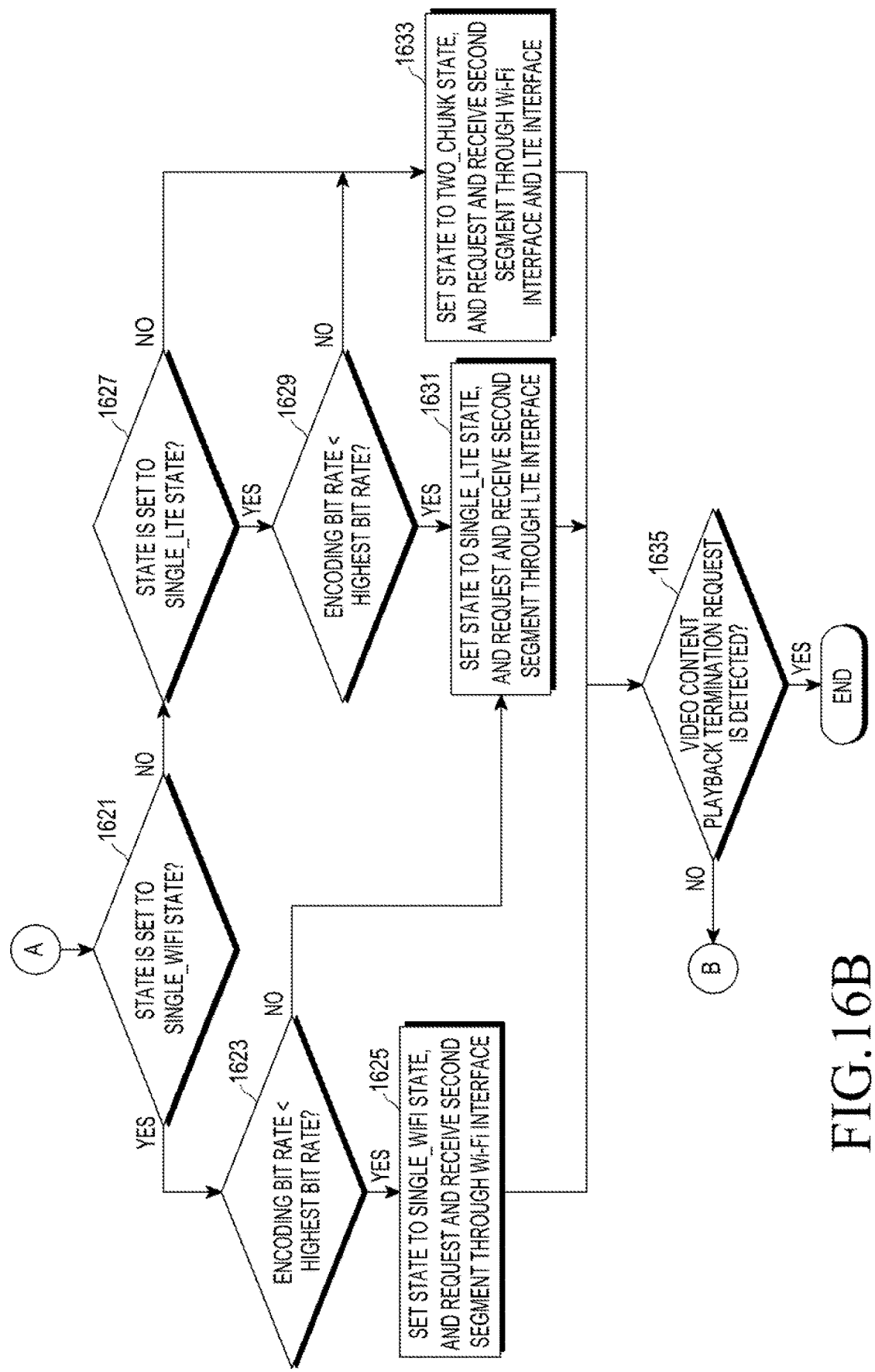

FIGS. 16a and 16b schematically illustrate a process of receiving streaming service data such that high-definition video content may be played from playback start time in a mobile communication system supporting a plurality of radio access interfaces according to an embodiment of the present disclosure.

Referring to FIGS. 16a and 16b, a station transmits a play list request message to a server and receives a play list response message from the server at step 1611, and proceeds to step 1613. The station selects a URL mapped to the lowest encoding bit rate applied to video content in a play list received through the play list response message for playing the first segment at step 1613, and proceeds to step 1615. The station transmits an HTTP range message to request to transmit the first segment through a Wi-Fi interface to the server, and receives the first segment from the server at step 1615, and proceeds to step 1617. Here, if a bandwidth of the Wi-Fi interface becomes greater than the encoding bit rate applied to the video content of the segment, the station sets a state to a SINGLE_WIFI state on which only a Wi-Fi interface is used.

Meanwhile, the station measures a bandwidth based on the received first segment at step 1617, and proceeds to step 1619. A process of measuring a bandwidth will be described with reference to FIG. 17, so a detailed description thereof will be omitted herein. The station selects a URL from the play list based on the bandwidth measurement result at step 1619, and proceeds to step 1621.

The station determines whether the state of the station is set to the SINGLE_WIFI state at step 1621. If the state is set to the SINGLE_WIFI state, the station proceeds to step 1623. The station determines whether an encoding bit rate applied to video content which corresponds to the selected URL is less than a maximum bit rate at step 1623. If the encoding bit rate applied to the video content which corresponds to the selected URL is not less than the maximum bit rate, that is, if the encoding bit rate applied to the video content which corresponds to the selected URL is greater than or equal to the maximum bit rate, the station proceeds to step 1625. The station sets the state to the SINGLE_WIFI state, transmits an HTTP range message to request to transmit the second segment to the server through the Wi-Fi interface, and receives the second segment from the server at step 1625, and proceeds to step 1635. The station determines whether a video content playback termination request is detected at step 1635. If the video content playback termination request is not detected, the station returns to step 1617.

If the encoding bit rate applied to the video content which corresponds to the selected URL is less than the maximum bit rate at step 1623, the station proceeds to step 1631. The station sets the state to a SINGLE_LTE state as a state on which only an LTE interface is used, transmits an HTTP range message to request to transmit the second segment to the server through the LTE interface, and receives the second segment from the server at step 1631, and proceeds to step 1635.

Meanwhile, if the state is not set to the SINGLE_WIFI state at step 1621, the station proceeds to step 1627. The station determines whether the state is set to the SINGLE_LTE sate at step 1627. If the state is set to the SINGLE_LTE sate, the station proceeds to step 1629. The station determines whether an encoding bit rate applied to video content which corresponds to the selected URL is less than a maximum bit rate at step 1629. If the encoding bit rate applied to the video content which corresponds to the selected URL is less than the maximum bit rate, the station proceeds to step 1631. If the state is not set to the SINGLE_LTE state at step 1627, the station proceeds to step 1633. The station sets the state to a TWO_CHUNK state on which two radio access interfaces, i.e., both the Wi-Fi interface and the LTE interface are used, transmits an HTTP range message to request to transmit the second segment to the server through the Wi-Fi interface and the LTE interface, and receives the second segment from the server at step 1633, and proceeds to step 1635.

Although FIGS. 16*a* and 16*b* illustrate a process of receiving streaming service data such that high-definition video content may be played from playback start time in a mobile communication system supporting a plurality of radio access interfaces according to an embodiment of the present disclosure, various changes could be made to FIGS. 16*a* and 16*b*. For example, although shown as a series of operations, various operations in FIGS. 16*a* and 16*b* could overlap, occur in parallel, occur in a different order, or occur multiple times.

A process of receiving streaming service data such that high-definition video content may be played from playback start time in a mobile communication system supporting a plurality of radio access interfaces according to an embodiment of the present disclosure has been described with reference to FIGS. 16*a* and 16*b*, and a process of measuring a bandwidth shown in step 1617 in FIG. 16*a* will be described with reference to FIG. 17.

Figure 17:
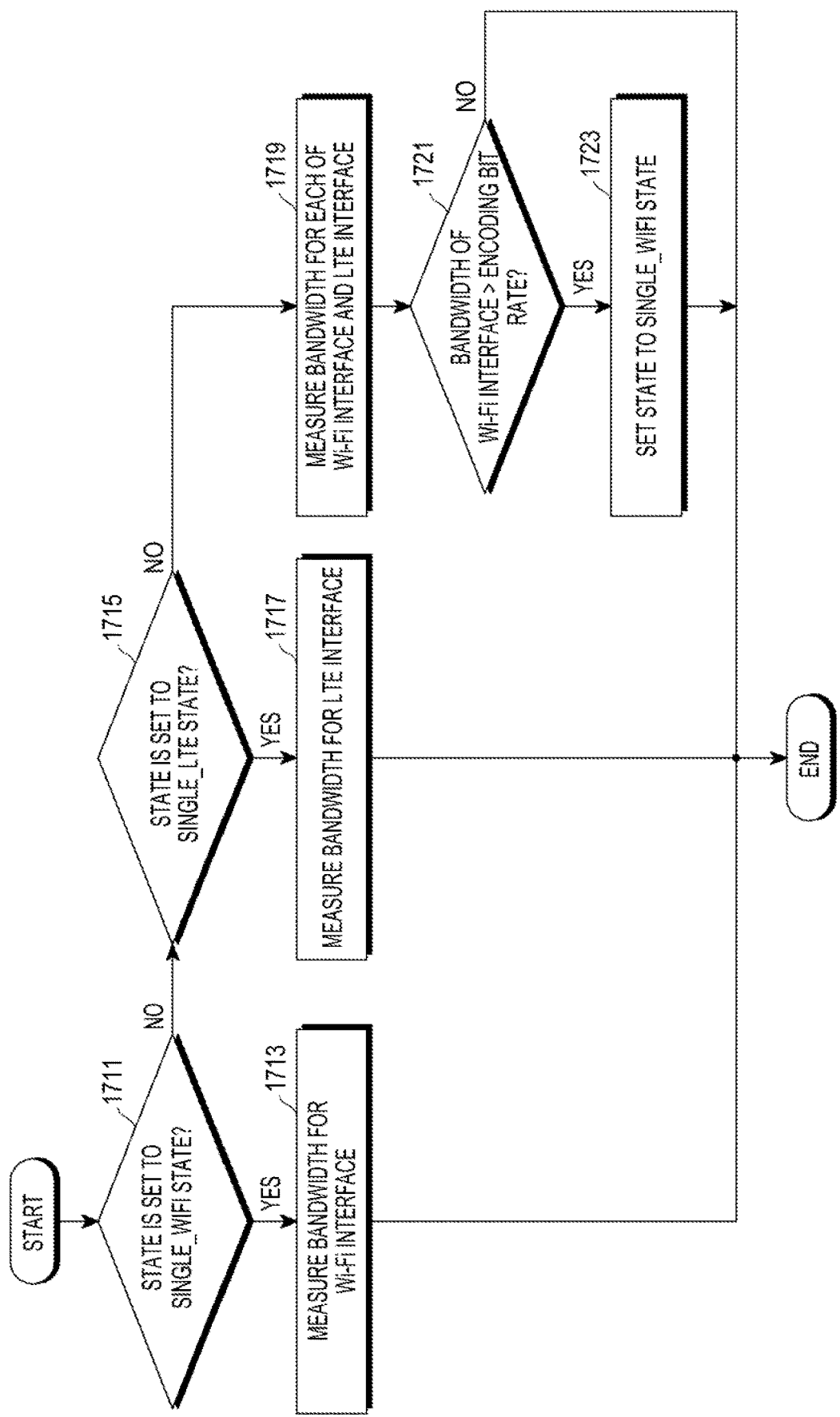

FIG. 17 schematically illustrates a process of measuring a bandwidth shown in step 1617 in FIG. 16*a*.

Referring to FIG. 17, a station determines whether a state of the station is set to a SINGLE_WIFI state at step 1711. If the state is set to the SINGLE_WIFI state, the station proceeds to step 1713. The station measures a bandwidth for a Wi-Fi interface at step 1713.

If the state is not set to the SINGLE_WIFI state at step 1711, the station proceeds to step 1715. The station determines whether a state of the station is set to a SINGLE_LTE state at step 1715. If the state is set to the SINGLE_LTE state, the station proceeds to step 1717. The station measures a bandwidth for an LTE interface at step 1717.

If the state is not set to the SINGLE_LTE state at step 1715, the station proceeds to step 1719. The station measures a bandwidth for each of the Wi-Fi interface and the LTE interface at step 1719 and proceeds to step 1721. The station determines whether the bandwidth of the Wi-Fi interface is greater than an encoding bit rate applied to corresponding video content at step 1721. If the bandwidth of the Wi-Fi interface is greater than the encoding bit rate applied to corresponding video content, the station proceeds to step 1723. The station sets the state to the SINGLE_WIFI state at step 1723.

Although FIG. 17 illustrates a process of measuring a bandwidth shown in step 1617 in FIG. 16*a*, various changes could be made to FIG. 17. For example, although shown as a series of operations, various operations in FIG. 17 could overlap, occur in parallel, occur in a different order, or occur multiple times.

A process of measuring a bandwidth shown in step 1617 in FIG. 16*a* has been described with reference to FIG. 17, and an inner structure of a server in a communication system supporting a plurality of radio access interfaces according to an embodiment of the present disclosure will be described with reference to FIG. 18.

Figure 18:
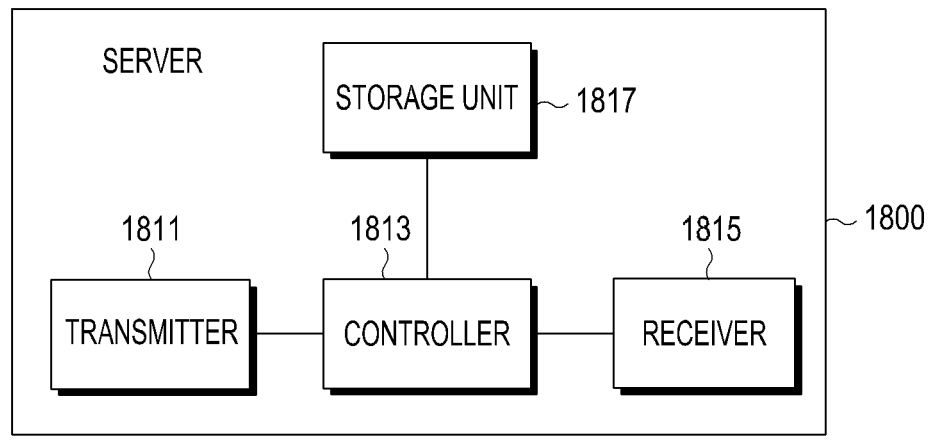
FIG. 18 schematically illustrates an inner structure of a server in a communication system supporting a plurality of radio access interfaces according to an embodiment of the present disclosure.

FIG. 18 schematically illustrates an inner structure of a server in a communication system supporting a plurality of radio access interfaces according to an embodiment of the present disclosure.

Referring to FIG. 18, a server 1800 includes a transmitter 1811, a controller 1813, a receiver 1815, and a storage unit 1817.

The controller 1813 controls the overall operation of the server 1800. The controller 1813 controls the server 1800 to perform a streaming service providing operation, i.e., an overall operation related to an operation of providing a streaming service to a station supporting a plurality of radio access interfaces according to an embodiment of the present disclosure. Here, the operation of providing the streaming service to the station supporting the plurality of radio access interfaces according to an embodiment of the present disclosure has been described with FIGS. 1 to 17, and a detailed description thereof will be omitted herein.

The transmitter 1811 transmits various signals and various messages to a station and the like under a control of the controller 1813. The various signals and various messages transmitted in the transmitter 1811 have been described with reference to FIGS. 1 to 17, and a detailed description thereof will be omitted herein.

The receiver 1815 receives various signals and various messages from the station and the like under a control of the controller 1813. The various signals and various messages received in the receiver 1815 have been described with reference to FIGS. 1 to 17, and a detailed description thereof will be omitted herein.

The storage unit 1817 stores various programs, various data, and the like necessary for an operation of the server 1800, and more particular, information related to an operation of providing a streaming service to a station supporting a plurality of radio access interfaces according to an embodiment of the present disclosure and the like. The storage unit 1817 stores various signals and various messages which are received by the receiver 1815 from the station and the like.

While the transmitter 1811, the controller 1813, the receiver 1815, and the storage unit 1817 are described in the server 1800 as separate units, however, the server 1800 may be implemented as a form that at least two of the transmitter 1811, the controller 1813, the receiver 1815, and the storage unit 1817 may be incorporated into a single unit.

An inner structure of a server in a communication system supporting a plurality of radio access interfaces according to an embodiment of the present disclosure has been described with reference to FIG. 18, and an inner structure of a station in a communication system supporting a plurality of radio access interfaces according to an embodiment of the present disclosure will be described with reference to FIG. 19.

Figure 19:
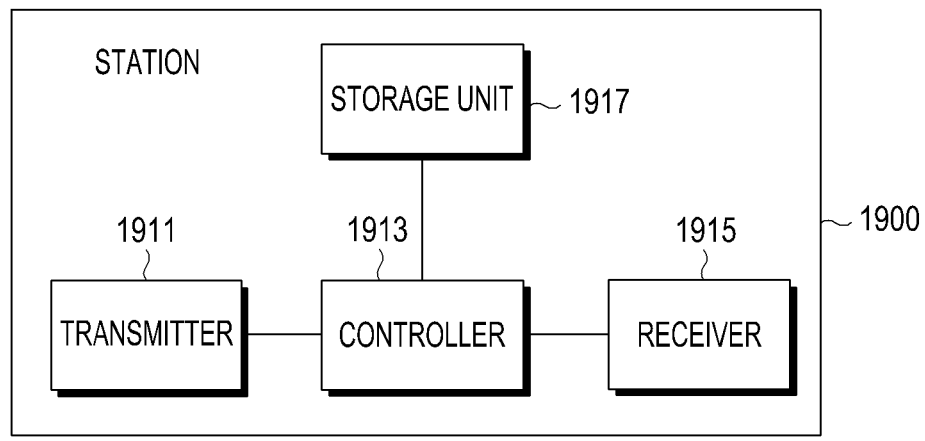
FIG. 19 schematically illustrates an inner structure of a station in a communication system supporting a plurality of radio access interfaces according to an embodiment of the present disclosure.

FIG. 19 schematically illustrates an inner structure of a station in a communication system supporting a plurality of radio access interfaces according to an embodiment of the present disclosure.

Referring to FIG. 19, a station 1900 includes a transmitter 1911, a controller 1913, a receiver 1915, and a storage unit 1917.

The controller 1913 controls the overall operation of the station 1900. The controller 1913 controls the station 1900 to perform a streaming service providing operation, i.e., an overall operation related to an operation of providing a streaming service to a station supporting a plurality of radio access interfaces according to an embodiment of the present disclosure. Here, the operation of providing the streaming service to the station supporting the plurality of radio access interfaces according to an embodiment of the present disclosure has been described with FIGS. 1 to 17, and a detailed description thereof will be omitted herein.

The transmitter 1911 transmits various signals and various messages to a server and the like under a control of the controller 1913. The various signals and various messages transmitted in the transmitter 1911 have been described with reference to FIGS. 1 to 17, and a detailed description thereof will be omitted herein. Further, an inner structure of the transmitter 1911 will be described with reference to FIG. 20, and a detailed description thereof will be omitted herein.

The receiver 1915 receives various signals and various messages from the server and the like under a control of the controller 1913. The various signals and various messages received in the receiver 1915 have been described with reference to FIGS. 1 to 17, and a detailed description thereof will be omitted herein.

The storage unit 1917 stores various programs, various data, and the like necessary for an operation of the station 1900, and more particular, information related to an operation of providing a streaming service to a station supporting a plurality of radio access interfaces according to an embodiment of the present disclosure and the like. The storage unit 1917 stores various signals and various messages which are received by the receiver 1915 from the server and the like.

While the transmitter 1911, the controller 1913, the receiver 1915, and the storage unit 1917 are described in the station 1900 as separate units, however, the station 1900 may be implemented as a form that at least two of the transmitter 1911, the controller 1913, the receiver 1915, and the storage unit 1917 may be incorporated into a single unit. An inner structure of a station in a communication system supporting a plurality of radio access interfaces according to an embodiment of the present disclosure has been described with reference to FIG. 19, and an inner structure of a transmitter 1911 in FIG. 19 will be described with reference to FIG. 20.

Figure 20:
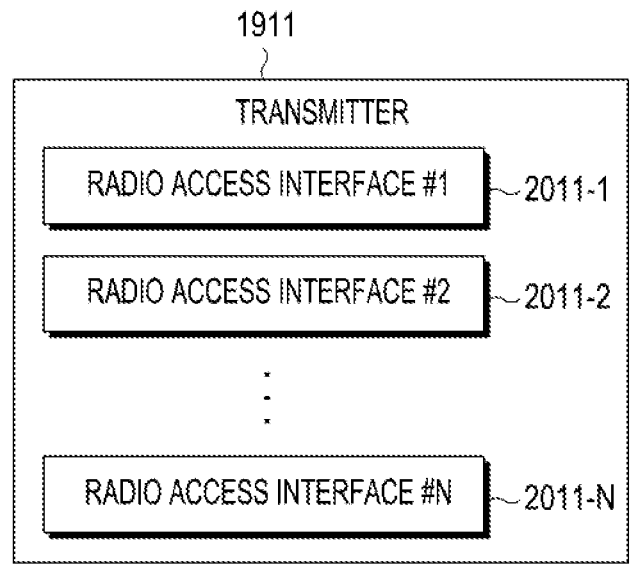
FIG. 20 schematically illustrates an inner structure of a transmitter 1911 in FIG. 19.

FIG. 20 schematically illustrates an inner structure of a transmitter 1911 in FIG. 19.

Referring to FIG. 20, the transmitter 1911 includes a plurality of radio access interfaces, e.g., N radio access interfaces, i.e., a radio access interface #1 2011-1, a radio access interface #2 2011-2, . . . , a radio access interface #N 2011-N. Here, one of the radio access interface #1 2011-1, the radio access interface #2 2011-2, . . . , the radio access interface #N 2011-N may be a Wi-Fi interface, and another one may be an LTE interface.

While the radio access interface #1 2011-1, the radio access interface #2 2011-2, . . . , the radio access interface #N 2011-N are described in the transmitter 1911 as separate units, however, the transmitter 1911 may be implemented as a form that at least two of the radio access interface #1 2011-1, the radio access interface #2 2011-2, . . . , the radio access interface #N 2011-N may be incorporated into a single unit.

An inner structure of a transmitter 1911 in FIG. 19 has been described with reference to FIG. 20, and an inner structure of a receiver 1915 in FIG. 19 will be described with reference to FIG. 21.

Figure 21:
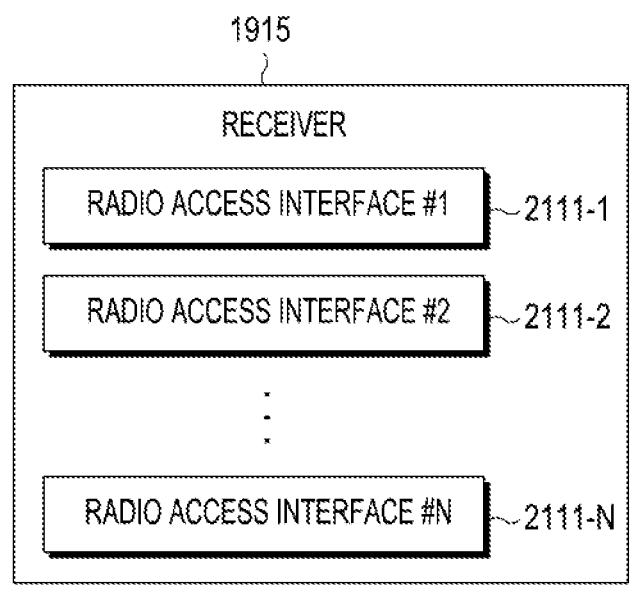
FIG. 21 schematically illustrates an inner structure of a receiver 1915 in FIG. 19.

FIG. 21 schematically illustrates an inner structure of a receiver 1915 in FIG. 19.

Referring to FIG. 21, the receiver 1915 includes a plurality of radio access interfaces, e.g., N radio access interfaces, i.e., a radio access interface #1 2111-1, a radio access interface #2 2111-2, . . . , a radio access interface #N 2111-N. Here, one of the radio access interface #1 2111-1, the radio access interface #2 2111-2, . . . , the radio access interface #N 2111-N may be a Wi-Fi interface, and another one may be an LTE interface.

While the radio access interface #1 2111-1, the radio access interface #2 2111-2, . . . , the radio access interface #N 2111-N are described in the receiver 1915 as separate units, however, the receiver 1915 may be implemented as a form that at least two of the radio access interface #1 2111-1, the radio access interface #2 2111-2, . . . , the radio access interface #N 2111-N may be incorporated into a single unit.

As is apparent from the foregoing description, an embodiment of the present disclosure enables to receive streaming service data in a mobile communication system supporting a plurality of radio access interfaces.

An embodiment of the present disclosure enables to seamlessly receive streaming service data in a mobile communication system supporting a plurality of radio access interfaces An embodiment of the present disclosure enables to receive streaming service data corresponding to an encoding bit rate applied to streaming service content in a mobile communication system supporting a plurality of radio access interfaces An embodiment of the present disclosure enables to receive streaming service data by considering load balancing in a mobile communication system supporting a plurality of radio access interfaces.

An embodiment of the present disclosure enables to receive streaming service data such that high-definition video content may be played from playback start time in a mobile communication system supporting a plurality of radio access interfaces according to an embodiment of the present disclosure.

An embodiment of the present disclosure enables to receive streaming service data by considering guarantee of stability in a mobile communication system supporting a plurality of radio access interfaces.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet).The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like).A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for receiving streaming service by a terminal in a mobile communication system, the method comprising:

receiving, by the terminal from a server, a message including information on an encoding bit rate of a streaming service data;

selecting, by the terminal, a first radio access interface and a second radio access interface of a plurality of radio access interfaces for receiving the streaming service data based on the information on the encoding bit rate in the received message and a network speed related to each of the plurality of radio access interfaces;

receiving, by the terminal from the server, the streaming service data through the selected first radio access interface and second radio access interface; and in response to determining that a network speed for the first radio access interface is less than a first threshold network speed:

when the network speed for the first radio access interface is less than a second threshold network speed which is less than the first threshold network speed, determining not to receive streaming service data through the first radio access interface;

when the network speed for the first radio access interface is equal to or more than the second threshold network speed, the first radio access interface receives streaming service data at the network speed, and the network speed is less than the first threshold network speed during a preset time, determining not to receive streaming service data through the first radio access interface; and when the network speed for the first radio access interface is equal to or more than the second threshold network speed, and the first radio access interface receives streaming service data at the network speed, and the network speed is not less than the first threshold network speed during the preset time, continuing to receive streaming service data through the first radio access interface, wherein the first threshold network speed is determined to be less than the encoding bit rate by a predetermined value, and wherein an amount of a data unit for delivering the streaming service data is determined based on a network speed of a radio access interface of the plurality of radio access interfaces and the encoding bit rate of the streaming service data.

2. The method of claim 1, wherein the first radio access interface and the second radio access interface are selected further based on at least one of being a primary radio access interface, a load balancing for the radio access interfaces, or a guarantee of stability for the radio access interfaces.

3. The method of claim 1, further comprising:

in response to determining that the network speed for the first radio access interface is less than the first threshold network speed, receiving a part of the streaming service data being received through the first radio access interface through the second radio access interface.

4. The method of claim 1, further comprising:

in response to determining that a received signal strength for the first radio access interface is less than a threshold received signal strength, receiving a part of the streaming service data being received through the first radio access interface through the second radio access interface.

5. The method of claim 1, further comprising:

in response to determining that the network speed for the first radio access interface is less than the first threshold network speed and the first radio access interface receives the streaming service data at the network speed less than the first threshold network speed during the preset time, receiving a part of the streaming service data being received through the first radio access interface through the second radio access interface.

6. The method of claim 1, further comprising:
in response to determining that the network speed for the first radio access interface is less than the first threshold network speed and the first radio access interface receives the streaming service data at the network speed less than the first threshold network speed during the preset time, receiving the streaming service data being received through the first radio access interface through the second radio access interface.

7. The method of claim 1, further comprising:
in response to determining that a received signal strength for the first radio access interface is less than a first threshold received signal strength:
when the received signal strength is less than a second threshold received signal strength, determining not to receive streaming service data through the first radio access interface;
when the received signal strength is equal to or more than the second threshold received signal strength and the first radio access interface receives streaming service data at the received signal strength less than the first threshold received signal strength during the preset time, determining not to receive streaming service data through the first radio access interface; and
when the received signal strength is equal to or more than the second threshold received signal strength and the first radio access interface receives streaming service data at the received signal strength equal to or more than the first threshold received signal strength during the preset time, determining to receive streaming service data through the first radio access interface.

8. The method of claim 7, further comprising:
in response to determining that the received signal strength for the first radio access interface is less than the first threshold received signal strength, receiving a part of the streaming service data being received through the first radio access interface through the second radio access interface.

9. The method of claim 7, further comprising:
in response to determining that the received signal strength for the first radio access interface is less than the first threshold received signal strength, receiving the streaming service data through the second radio access interface.

10. The method of claim 1, wherein the first radio access interface and the second radio access interface are selected further based on at least one of being a primary radio access interface, a load balancing for the radio access interfaces, or a guarantee of stability for the radio access interfaces.

11. A terminal for receiving streaming service in a mobile communication system, the terminal comprising:
at least one processor configured to:
receive, from a server, a message including information on an encoding bit rate of a streaming service data, and
select a first radio access interface and a second radio access interface of a plurality of radio access interfaces for receiving the streaming service data based on the information on the encoding bit rate in the received message and a network speed related to each of the plurality of radio access interfaces;

a receiver configured to receive from the server, the streaming service data through the selected first radio access interface and second radio access interface; and
in response to determining that a network speed for the first radio access interface is less than a first threshold network speed:
when the network speed for the first radio access interface is less than a second threshold network speed which is less than the first threshold network speed, determine not to receive streaming service data through the first radio access interface;
when the network speed for the first radio access interface is equal to or more than the second threshold network speed, the first radio access interface receives streaming service data at the network speed, and the network speed is less than the first threshold network speed during a preset time, determine not to receive streaming service data through the first radio access interface; and
when the network speed for the first radio access interface is equal to or more than the second threshold network speed, the first radio access interface receives streaming service data at the network speed, and the network speed is not less than the first threshold network speed during the preset time, continuing to receive streaming service data through the first radio access interface,
wherein the first threshold network speed is determined to be less than the encoding bit rate by a predetermined value, wherein an amount of a data unit for delivering the streaming service data is
determined based on a network speed of a radio access interface of the plurality of radio access interfaces and the encoding bit rate of the streaming service data.

12. The terminal of claim 11, wherein the at least one processor is further configured to:
in response to determining that the network speed for the first radio access interface is less than the first threshold network speed, control to receive a part of the streaming service data being received through the first radio access interface through the second radio access interface.

13. The terminal of claim 11, wherein the at least one processor is further configured to:
in response to determining that a received signal strength for the first radio access interface is less than a threshold received signal strength, control to receive a part of the streaming service data being received through the first radio access interface through the second radio access interface.

14. The terminal of claim 11, wherein the at least one processor is further configured to: in response to determining that the network speed for the first radio access interface is less than the first threshold network speed and the first radio access interface receives the streaming service data at the network speed less than the first threshold network speed during the preset time, control to receive a part of the streaming service data being received through the first radio access interface through the second radio access interface.

15. The terminal of claim 11, wherein the at least one processor is further configured to: in response to determining that the network speed for the first radio access interface is less than the first threshold network speed and the first radio access interface receives the streaming service data at the network speed less than the first threshold network speed during the preset time, control to receive the streaming service data being received through the first radio access interface through the second radio access interface.

16. The terminal of claim 11, wherein the at least one processor is further configured to:
in response to determining that a received signal strength for the first radio access interface is less than a first threshold received signal strength:
when the received signal strength is less than a second threshold received signal strength, control not to receive streaming service data through the first radio access interface,
when the received signal strength is equal to or more than the second threshold received signal strength and the first radio access interface receives streaming service data at the received signal strength less than the first threshold received signal strength during the preset time, control not to receive streaming service data through the first radio access interface, and
when the received signal strength is equal to or more than the second threshold received signal strength and the first radio access interface receives streaming service data at the received signal strength equal to or more than the first threshold received signal strength during the preset time, control to receive streaming service data through the first radio access interface.

17. The terminal of claim 16, wherein the at least one processor is further configured to: in response to determining that the received signal strength for the first radio access interface is less than the first threshold received signal strength, control to receive a part of the streaming service data being received through the first radio access interface through the second radio access interface.

18. The terminal of claim 16, wherein the at least one processor is further configured to: in response to determining that the received signal strength for the first radio access interface is less than the first threshold received signal strength, control to receive the streaming service data being received through the first radio access interface through the second radio access interface.

* * * * *